US010652575B2

(12) United States Patent
Zhang et al.

(10) Patent No.: US 10,652,575 B2
(45) Date of Patent: May 12, 2020

(54) LINEAR MODEL CHROMA INTRA PREDICTION FOR VIDEO CODING

(71) Applicant: QUALCOMM Incorporated, San Diego, CA (US)

(72) Inventors: Kai Zhang, San Diego, CA (US); Jianle Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/705,029

(22) Filed: Sep. 14, 2017

(65) Prior Publication Data

US 2018/0077426 A1 Mar. 15, 2018

Related U.S. Application Data

(60) Provisional application No. 62/395,145, filed on Sep. 15, 2016.

(51) Int. Cl.
*H04N 19/593* (2014.01)
*H04N 19/157* (2014.01)
*H04N 19/13* (2014.01)
*H04N 19/46* (2014.01)
*H04N 19/147* (2014.01)
*H04N 19/80* (2014.01)
*H04N 19/132* (2014.01)
*H04N 19/117* (2014.01)
*H04N 19/176* (2014.01)
*H04N 19/186* (2014.01)

(52) U.S. Cl.
CPC ......... *H04N 19/593* (2014.11); *H04N 19/117* (2014.11); *H04N 19/13* (2014.11); *H04N 19/132* (2014.11); *H04N 19/147* (2014.11); *H04N 19/157* (2014.11); *H04N 19/176* (2014.11); *H04N 19/186* (2014.11); *H04N 19/46* (2014.11); *H04N 19/80* (2014.11)

(58) Field of Classification Search
CPC .......................... H04N 19/117; H04N 19/132
USPC .......................................................... 375/240
See application file for complete search history.

(56) References Cited

U.S. PATENT DOCUMENTS

| 2013/0136174 | A1* | 5/2013 | Xu | H04N 19/105 375/240.12 |
| 2015/0036745 | A1* | 2/2015 | Hsu | H04N 19/593 375/240.12 |
| 2017/0019672 | A1* | 1/2017 | Kim | H04N 19/186 |

(Continued)

OTHER PUBLICATIONS

International Preliminary Report on Patentability from International Application No. PCT/US2017/051821, dated Nov. 30, 2018, 26 pp.

(Continued)

*Primary Examiner* — William C Vaughn, Jr.
*Assistant Examiner* — Jerry T Jean Baptiste
(74) *Attorney, Agent, or Firm* — Shumaker & Sieffert, P.A.

(57) ABSTRACT

A method of decoding video data, including receiving an encoded block of luma samples for a first block of video data, decoding the encoded block of luma samples to create reconstructed luma samples, and predicting chroma samples for the first block of video data using the reconstructed luma samples for the first block of video data and two or more linear prediction models.

27 Claims, 23 Drawing Sheets

(56) References Cited

U.S. PATENT DOCUMENTS

2017/0295366 A1\* 10/2017 Chen ............... H04N 19/593
2017/0366818 A1\* 12/2017 Zhang ............... H04N 19/593

OTHER PUBLICATIONS

Response to Written Opinion from International Application No. PCT/US2017/051821 as filed on Jun. 22, 2018, 23 pp.

Second Written Opinion from International Application No. PCT/US2017/051821, dated Jul. 16, 2018, 9 pp.

International Search Report and Written Opinion—PCT/US2017/051821—ISA/EPO—dated Feb. 12, 2018, 20 pp.

ITU-T H.265, Series H: Audiovisual and Multimedia Systems, Infrastructure of audiovisual services—Coding of moving video, High efficiency video coding, The International Telecommunication Union, Apr. 2015, 634 pp.

"ITU-T H.223, Series H: Audiovisual and Multimedia Systems, Infrastructure of audiovisual services—Transmission multiplexing and synchronization, Multiplexing protocol for low bit rate multimedia communication," Jul. 2001, 74 pp.

"ITU-T H.263, Series H: Audiovisual and Multimedia Systems, Infrastructure of audiovisual services—Coding of moving video, Video coding for low bit rate communication," Jan. 2005, 226 pp.

Chen J., et al., "CE6.a.4: Chroma intra prediction by reconstructed luma samples," JCTVC-E266, JCTVC meeting, Geneva, Switzerland, Mar. 16-23, 2011, 10 pp.

Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pp.

Zhang et al., "New Modes for Chroma Intra Prediction," JCT-VC Meeting; MPEG meeting, Nov. 21, 2011-Nov. 30, 2011 (Joint Collaborative Team on Video Coding of ISO/IEC JCTC1/SC29/WG11 and ITU-T SG.16); No. JCTVC-G358, Nov. 10, 2011, 8 pp.

"Segmented regression," Wikipedia, May 29, 2016, retrieved from Internet: https://web.archive.org/web/20160529022909/https://en.wikipedia.org/wiki/Segmented_regression, retrieved on Dec. 11, 2017, 4 pp.

Bertan, et al. "Clustered linear regression," Knowledge-Based Systems, vol. 15, No. 3, Mar. 2002, pp. 169-175.

Zhang et al., "Enhanced Cross-component Linear Model Intra-prediction," JVET Meeting; Oct. 15, 2016-Oct. 21, 2016, (Joint Video Exploration Team of ISO/IEC JTC1/SC29/WG11 and ITU-T SG.16), JVET-D0110, Oct. 6, 2016, 5 pp.

Invitation to Pay Additional Fees from International Application No. PCT/US2017/051821, dated Dec. 20, 2017, 16 pp.

Sullivan et al., "Overview of the High Efficiency Video Coding (HEVC) Standard," IEEE Transactions on Circuits and Systems for Video Technology, vol. 22, No. 12, Dec. 2012, pp. 1649-1668.

Suehring K., et al., "JEVT common test conditions and software reference configurations", 2nd Meeting, Feb. 20 through 26, 2016, San Diego, USA; Joint Collaborative Video Exploration Team (JVET) of ITU-T SG 16 WP 3 and ISO/IEC JTC 1/SC 29/WG 11, JVET-B1010, Apr. 4, 2016, 4 pp.

Zhang K., et al., "Enhanced Cross-component Linear Model Intra-Prediction", 4th JVET Meeting; Oct. 15, 2016-Oct. 21, 2016; Chengdu; (The Joint Video Exploration Team of ISO/IEC JTC1/SC29/WG11 and ITU-T SG.16 ); URL: http://phenix.int-evry.fr/jvet/, No. JVET-D0110-v3, Oct. 18, 2016, XP030150355, 6 p.

Zhang K., et al., "EE5: Enhanced Cross-component Linear Model Intra-Prediction", 5th JVET Meeting; Jan. 12, 2017-Jan. 20, 2017; Geneva; (The Joint Video Exploration Team of ISO/IEC JTC1/SC29/WG11 and ITU-T SG.16 ); URL: http://phenix.int-evry.fr/jvet/,No. JVET-E0077, Jan. 4, 2017, XP030150563, 4 pages.

\* cited by examiner

LINEAR MODEL CHROMA INTRA PREDICTION FOR VIDEO CODING

This application claims the benefit of U.S. Provisional Application No. 62/395,145, filed Sep. 15, 2016, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for enhanced linear model chroma intra prediction. This disclosure describes techniques that include predicting chroma samples for a corresponding block of luma samples using two or more linear prediction models. In other examples, a block of luma samples may be down-sampled using one of a plurality of down-sampling filters. The down-sampled luma samples may then be used to predict corresponding chroma samples using linear model prediction techniques. In other examples, chroma samples may be predicted using a combination of linear model prediction and angular prediction.

In one example of the disclosure, a method of decoding video data comprises receiving an encoded block of luma samples for a first block of video data, decoding the encoded block of luma samples to create reconstructed luma samples, and predicting chroma samples for the first block of video data using the reconstructed luma samples for the first block of video data and two or more linear prediction models.

In another example of the disclosure, a method of encoding video data comprises encoding a block of luma samples for a first block of video data, reconstructing the encoded block of luma samples to create reconstructed luma samples, and predicting chroma samples for the first block of video data using the reconstructed luma samples for the first block of video data and two or more linear prediction models.

In another example of the disclosure, an apparatus configured to decode video data comprises a memory configured to receive a first block of video data, and one or more processors configured to receive an encoded block of luma samples for the first block of video data, decode the encoded block of luma samples to create reconstructed luma samples, and predict chroma samples for the first block of video data using the reconstructed luma samples for the first block of video data and two or more linear prediction models.

In another example of the disclosure, an apparatus configured to encode video data comprises a memory configured to receive a first block of video data, and one or more processors configured to encode a block of luma samples for a first block of video data, reconstruct the encoded block of luma samples to create reconstructed luma samples, and predict chroma samples for the first block of video data using the reconstructed luma samples for the first block of video data and two or more linear prediction models.

In another example of the disclosure, an apparatus configured to decode video data comprises means for receiving an encoded block of luma samples for a first block of video data, means for decoding the encoded block of luma samples to create reconstructed luma samples, and means for predicting chroma samples for the first block of video data using the reconstructed luma samples for the first block of video data and two or more linear prediction models.

In another example, this disclosure describes a computer-readable storage medium storing instructions that, when executed, causes one or more processors configured to decode video data to receive an encoded block of luma samples for the first block of video data decode the encoded block of luma samples to create reconstructed luma samples, and predict chroma samples for the first block of video data using the reconstructed luma samples for the first block of video data and two or more linear prediction models.

In one example, method of coding video data comprises determining luma samples for a first block of video data, and predicting chroma samples for the first block of video data using the luma samples for the first block of video data and two or more prediction models. In one example, device for coding video data comprises a memory storing video data, and a video coder comprising one or more processors configured to: determine luma samples for a first block of video data, and predict chroma samples for the first block of video data using the luma samples for the first block of video data and two or more prediction models.

In one example, a method of coding video data comprises determining luma samples for a first block of video data; determining a prediction model to use to predict chroma samples for the first block of video data; determining one of a plurality of down-sampling filters to use to down-sample the luma samples; down-sample the luma samples using the determined down-sampling filter to produce down-sampled luma samples; and predicting chroma samples for the first block of video data using the down-sampled luma samples for the first block of video data and the prediction model.

In one example, a method of coding video data comprises determining whether a current chroma block of the video data is coded using a linear model, in the case that the current chroma block of video data is coded using a linear model, coding the current chroma block of video data using the linear model, in the case that the current chroma block of video data is not coded using a linear model, the method further comprising determining whether linear mode angular prediction is enabled when the current block is determined not to be coded using the linear model, applying, if linear mode angular prediction is enabled, an angular mode prediction pattern and a linear model prediction pattern to samples of the current chroma block, and determining a final linear mode angular prediction for the samples of the current chroma block as a weighted sum of the applied angular mode prediction pattern and linear model prediction pattern.

In one example, a device for coding video data comprises a memory storing video data, and a video coder comprising one or more processors configured to determine whether a current chroma block of the video data is coded using a linear model, in the case that the current chroma block of video data is coded using a linear model, code the current chroma block of video data using the linear model, in the case that the current chroma block of video data is not coded using a linear model, the one or more processors being further configured to determine whether linear mode angular prediction is enabled when the current block is determined not to be coded using the linear model, apply, if linear mode angular prediction is enabled, an angular mode prediction pattern and a linear model prediction pattern to samples of the current chroma block, and determine a final linear mode angular prediction for the samples of the current chroma block as a weighted sum of the applied angular mode prediction pattern and linear model prediction pattern.

In one example, a method of coding video data comprises determining a number of neighboring chroma blocks, relative to a current block video data, that are coded using a linear model coding mode, and dynamically changing a code word used to indicate a particular type of the linear model coding mode based on the determined number of neighboring chroma blocks of the video data coded using the linear model coding mode.

In one example, a device for coding video data comprises a memory storing video data, and a video coder comprising one or more processors configured to determine a number of neighboring chroma blocks, relative to a current block vide data, that are coded using a linear model coding mode, and dynamically change a code word used to indicate a particular type of the linear model coding mode based on the determined number of neighboring chroma blocks of the video data coded using the linear model coding mode.

In one example, a method of coding video data comprises determining a size of a current chroma block of the video data, comparing the size of the current chroma block to a threshold, applying a linear model mode of a plurality of linear model modes when the size of the current chroma block satisfies the threshold, and not applying the linear model mode of the plurality of linear model modes when the size of the current chroma block does not satisfy the threshold.

In one example, a device for coding video data comprises a memory storing video data, and a video coder comprising one or more processors configured to determine a size of a current chroma block of the video data, compare the size of the current chroma block to a threshold, apply a linear model mode of a plurality of linear model modes when the size of the current chroma block satisfies the threshold, and not apply the linear model mode of the plurality of linear model modes when the size of the current chroma block does not satisfy the threshold.

In one example, a device configured to code video data comprises means for performing any combination of methods described in this disclosure. In another example, a computer-readable medium is encoded with instructions that, when executed, cause one or more processors of a device configured to code video data to perform any combination of methods described in this disclosure. In another example, any combination of techniques described in this disclosure may be performed.

The details of one or more examples are set forth in the accompanying drawings and the description below. Other features, objects, and advantages will be apparent from the description and drawings, and from the claims.

DETAILED DESCRIPTION

This disclosure relates to cross-component prediction in video codecs, and more particularly to techniques for linear model (LM) chroma intra prediction. In one example of the disclosure, multi-model LM (MMLM) techniques are described. When using a MMLM for chroma intra prediction, a video coder (e.g., a video encoder or video decoder) may use more than one linear model for predicting a block of chroma components from a corresponding block of luma components (e.g., coding unit (CU) or prediction unit (PU). Neighboring luma samples and neighboring chroma samples of the current block may be classified into several groups, and each group may be used as a training set to derive a separate linear model. In one example, the samples of the corresponding luma block may be further classified based on the same rule for the classification of neighboring samples. A video coder may apply each linear model to portions of the current luma block, depending on the classification, to obtain partial predicted chroma blocks. The partial predicted chroma blocks from the multiple linear models may be combined to obtain the final predicted chroma block.

In another example of the disclosure, techniques for a multi-filter LM mode are described. When using multi-filter LM (MFLM) chroma prediction techniques, a video coder may use than one luma down-sampling filter if the video data is not in the 4:4:4 format. That is, if the chroma blocks are sub-sampled compared to the luma values (i.e., the video data is not 4:4:4), a video coder may down-sample the luma block for purposes of cross-component chroma intra prediction. In this way, there is a 1:1 correlation between luma samples and chroma samples. The MFLM techniques of this disclosure may be used in addition to the down-sampling filters defined in examples of the Joint Exploratory Model (JEM-3.0) currently under development by the Joint Video Exploration Team (WET).

In another example of the disclosure, techniques for an LM-Angular Prediction mode are described. When using LM-Angular Prediction (LAP), some type of angular prediction (e.g., angular prediction may include directional, DC, planar, or other non-cross-component intra prediction) and some type of LM prediction may be combined together to obtain the final prediction for a chroma block. Using either the multi-model LM (MMLM) chroma prediction (with or without multi-filter LM (MFLM)) and/or the LM-Angular Prediction (LAP) prediction techniques described herein, whether alone or in combination, may result in a bitrate-distortion (BD-rate) coding gain of approximately 0.4% and 3.5% on luma and chroma components individually, with a slight increase in encoding time (e.g., 104% encoding time).

Figure 1:
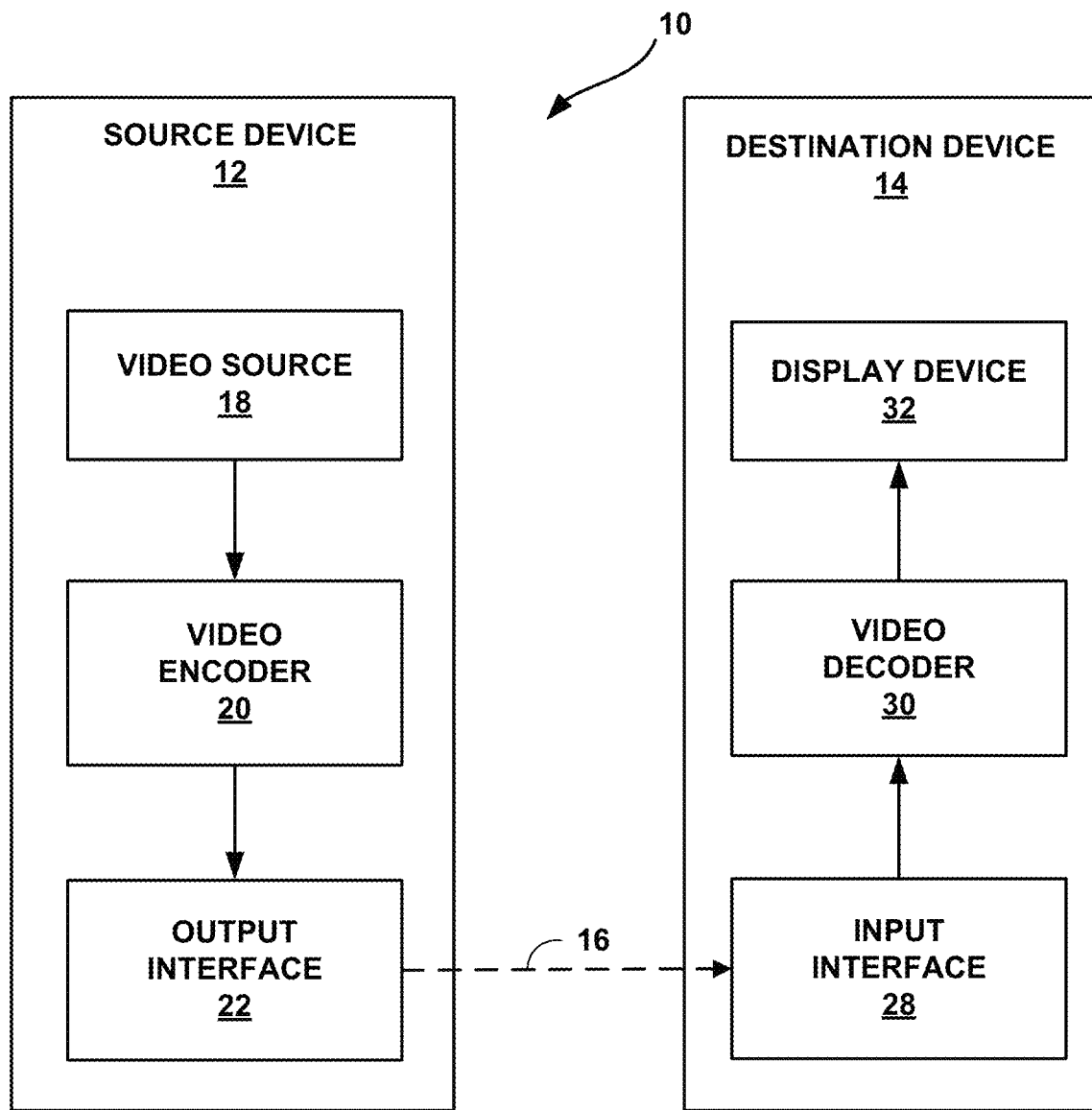
FIG. 1 is a block diagram illustrating an example video encoding and decoding system that may utilize techniques for multi-model linear model chroma intra prediction described in this disclosure.

FIG. 1 is a block diagram illustrating an example video encoding and decoding system 10 that may utilize techniques for linear model chroma intra prediction described in this disclosure. As shown in FIG. 1, system 10 includes a source device 12 that generates encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to computer-readable medium 16 that is configured as a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or video decoder 30 of destination device 14 may be configured to apply the techniques for enhanced linear model chroma intra prediction described in this disclosure. In other examples, source device 12 and destination device 14 may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for enhanced linear model chroma intra prediction described in this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. In other examples, video encoder 20 and video decoder may operate according to a future video coding standard, including the standard currently under development by the JVET. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, and may apply to future video coding standards. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, which may include fixed function and/or programmable processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random-access point (RAP) picture. A video sequence may include syntax data in a sequence parameter set (SPS) that includes characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Figure 2:
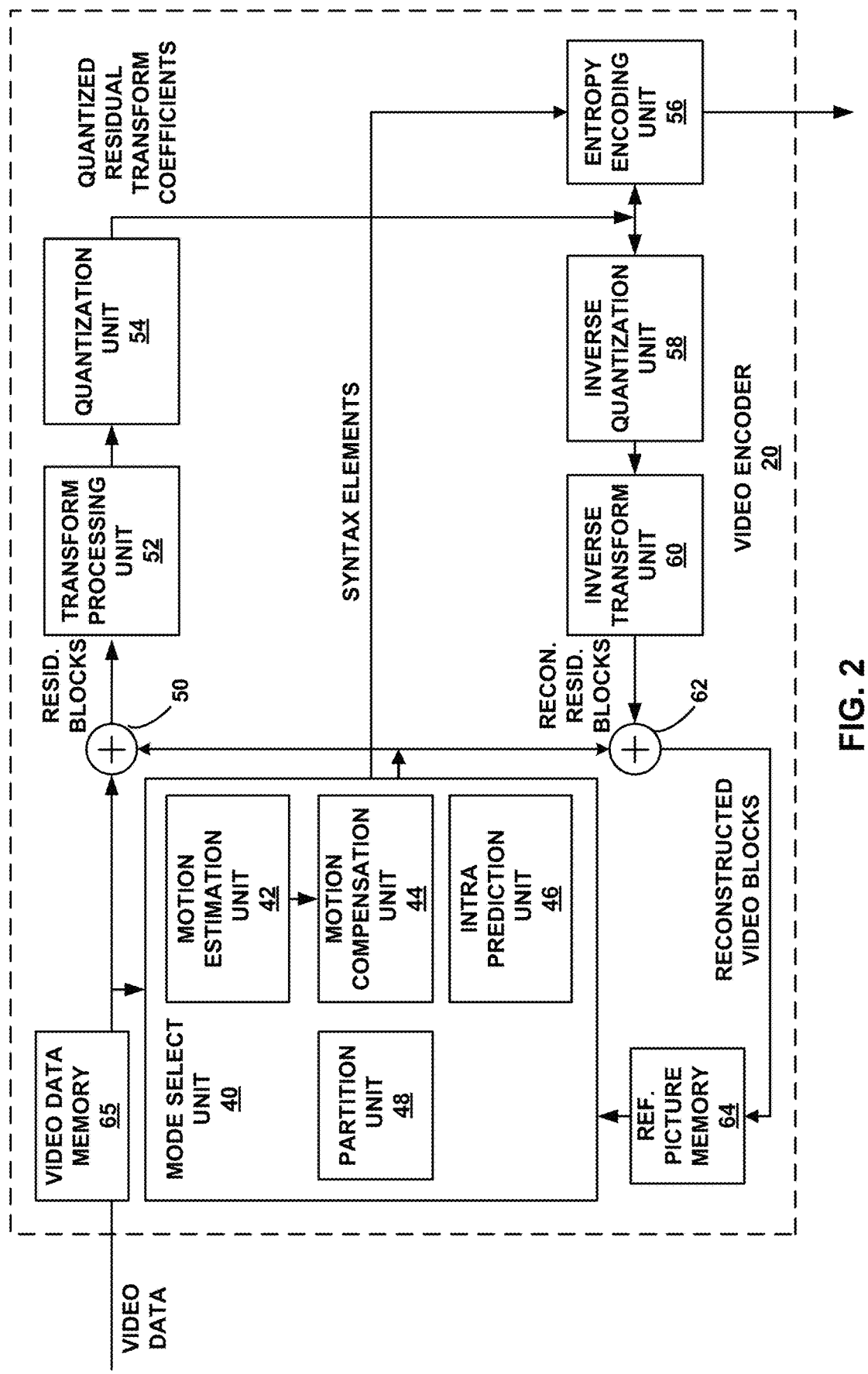
FIG. 2 is a block diagram illustrating an example video encoder that may implement techniques for multi-model linear model chroma intra prediction described in this disclosure.

FIG. 2 is a block diagram illustrating an example of video encoder 20 that may implement techniques for enhanced linear model chroma intra prediction described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), video data memory 65, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

As shown in FIG. 2, video encoder 20 receives video data and stores the received video data in video data memory 85. Video data memory 65 may store video data to be encoded by the components of video encoder 20. The video data stored in video data memory 65 may be obtained, for example, from video source 18. Reference picture memory 64 may be a reference picture memory that stores reference video data for use in encoding video data by video encoder 20, e.g., in intra- or inter-coding modes. Video data memory 65 and reference picture memory 64 may be formed by any of a variety of memory devices, such as dynamic random-access memory (DRAM), including synchronous DRAM (SDRAM), magnetoresistive RAM (MRAIVI), resistive RAM (RRAM), or other types of memory devices. Video data memory 65 and reference picture memory 64 may be provided by the same memory device or separate memory devices. In various examples, video data memory 65 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Among the possible intra prediction modes, mode select unit 40 may determine to use a linear model chroma intra prediction mode according to the techniques of this disclosure. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

As will be explained in more detail below, intra prediction unit 46 may be configured to perform the enhanced linear model chroma intra prediction techniques described in this disclosure.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured encode a block of luma samples for a first block of video data, reconstruct the encoded block of luma samples to create reconstructed luma samples, and predict chroma samples for the first block of video data using the reconstructed luma samples for the first block of video data and two or more linear prediction models.

In one example, a method of coding video data comprises determining luma samples for a first block of video data; determining a prediction model to use to predict chroma samples for the first block of video data; determining one of a plurality of down-sampling filters to use to down-sample the luma samples; down-sample the luma samples using the determined down-sampling filter to produce down-sampled luma samples; and predicting chroma samples for the first block of video data using the down-sampled luma samples for the first block of video data and the prediction model.

In one example, a method of coding video data comprises determining whether a current chroma block of the video data is coded using a linear model, in the case that the current chroma block of video data is coded using a linear model, coding the current chroma block of video data using the linear model, in the case that the current chroma block of video data is not coded using a linear model, the method further comprising determining whether linear mode angular prediction is enabled when the current block is determined not to be coded using the linear model, applying, if linear mode angular prediction is enabled, an angular mode prediction pattern and a linear model prediction pattern to samples of the current chroma block, and determining a final linear mode angular prediction for the samples of the current chroma block as a weighted sum of the applied angular mode prediction pattern and linear model prediction pattern.

In one example, a device for coding video data comprises a memory storing video data, and a video coder comprising one or more processors configured to determine whether a current chroma block of the video data is coded using a linear model, in the case that the current chroma block of video data is coded using a linear model, code the current chroma block of video data using the linear model, in the case that the current chroma block of video data is not coded using a linear model, the one or more processors being further configured to determine whether linear mode angular prediction is enabled when the current block is determined not to be coded using the linear model, apply, if linear mode angular prediction is enabled, an angular mode prediction pattern and a linear model prediction pattern to samples of the current chroma block, and determine a final linear mode angular prediction for the samples of the current chroma block as a weighted sum of the applied angular mode prediction pattern and linear model prediction pattern.

In one example, a method of coding video data comprises determining a number of neighboring chroma blocks, relative to a current block video data, that are coded using a linear model coding mode, and dynamically changing a code word used to indicate a particular type of the linear model coding mode based on the determined number of neighboring chroma blocks of the video data coded using the linear model coding mode.

In one example, a device for coding video data comprises a memory storing video data, and a video coder comprising one or more processors configured to determine a number of neighboring chroma blocks, relative to a current block vide data, that are coded using a linear model coding mode, and dynamically change a code word used to indicate a particular type of the linear model coding mode based on the determined number of neighboring chroma blocks of the video data coded using the linear model coding mode.

In one example, a method of coding video data comprises determining a size of a current chroma block of the video data, comparing the size of the current chroma block to a threshold, applying a linear model mode of a plurality of linear model modes when the size of the current chroma block satisfies the threshold, and not applying the linear model mode of the plurality of linear model modes when the size of the current chroma block does not satisfy the threshold.

In one example, a device for coding video data comprises a memory storing video data, and a video coder comprising one or more processors configured to determine a size of a current chroma block of the video data, compare the size of the current chroma block to a threshold, apply a linear model mode of a plurality of linear model modes when the size of the current chroma block satisfies the threshold, and not apply the linear model mode of the plurality of linear model modes when the size of the current chroma block does not satisfy the threshold.

Figure 3:
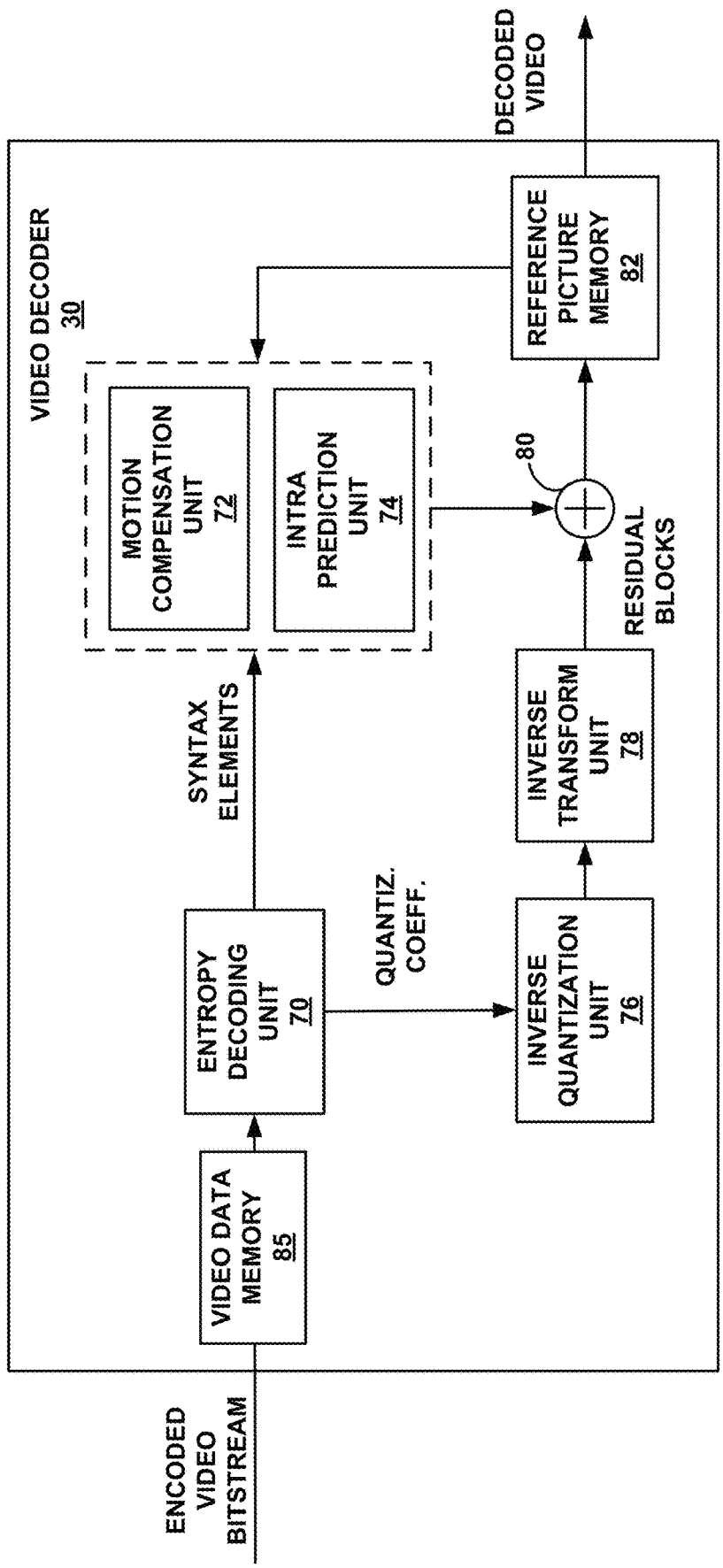
FIG. 3 is a block diagram illustrating an example video decoder that may implement techniques for multi-mode linear model chroma intra prediction described in this disclosure.

FIG. 3 is a block diagram illustrating an example of video decoder 30 that may implement techniques for enhanced linear model chroma intra prediction described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82, video data memory 85, and summer 80. Video decoder 30 may, in some examples, perform a decoding pass, generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Video decoder 30 stores the received encoded video bitstream in video data memory 85. Video data memory 85 may store video data, such as an encoded video bitstream, to be decoded by the components of video decoder 30. The video data stored in video data memory 85 may be obtained, for example, via computer-readable medium 16, from storage media, or from a local video source, such as a camera, or by accessing physical data storage media. Video data memory 85 may form a coded picture buffer (CPB) that stores encoded video data from an encoded video bitstream. Reference picture memory 82 may be a reference picture memory that stores reference video data for use in decoding video data by video decoder 30, e.g., in intra- or inter-coding modes. Video data memory 85 and reference picture memory 82 may be formed by any of a variety of memory devices, such as DRAM, SDRAM, MRAM, RRAM, or other types of memory devices. Video data memory 85 and reference picture memory 82 may be provided by the same memory device or separate memory devices. In various examples, video data memory 85 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

As will be explained in more detail below, intra prediction unit 74 may be configured to perform the enhanced linear model chroma intra prediction techniques described in this disclosure.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to receive an encoded block of luma samples for the first block of video data, decode the encoded block of luma samples to create reconstructed luma samples, and predict chroma samples for the first block of video data using the reconstructed luma samples for the first block of video data and two or more linear prediction models.

In one example, a method of coding video data comprises determining luma samples for a first block of video data; determining a prediction model to use to predict chroma samples for the first block of video data; determining one of a plurality of down-sampling filters to use to down-sample the luma samples; down-sampling the luma samples using the determined down-sampling filter to produce down-sampled luma samples; and predicting chroma samples for the first block of video data using the down-sampled luma samples for the first block of video data and the prediction model.

In one example, a method of coding video data comprises determining whether a current chroma block of the video data is coded using a linear model, in the case that the current chroma block of video data is coded using a linear model, coding the current chroma block of video data using the linear model, in the case that the current chroma block of video data is not coded using a linear model, the method further comprising determining whether linear mode angular prediction is enabled when the current block is determined not to be coded using the linear model, applying, if linear mode angular prediction is enabled, an angular mode prediction pattern and a linear model prediction pattern to samples of the current chroma block, and determining a final linear mode angular prediction for the samples of the current chroma block as a weighted sum of the applied angular mode prediction pattern and linear model prediction pattern.

In one example, a device for coding video data comprises a memory storing video data, and a video coder comprising one or more processors configured to determine whether a current chroma block of the video data is coded using a linear model, in the case that the current chroma block of video data is coded using a linear model, code the current chroma block of video data using the linear model, in the case that the current chroma block of video data is not coded using a linear model, the one or more processors being further configured to determine whether linear mode angular prediction is enabled when the current block is determined not to be coded using the linear model, apply, if linear mode angular prediction is enabled, an angular mode prediction pattern and a linear model prediction pattern to samples of the current chroma block, and determine a final linear mode angular prediction for the samples of the current chroma block as a weighted sum of the applied angular mode prediction pattern and linear model prediction pattern.

In one example, a method of coding video data comprises determining a number of neighboring chroma blocks, relative to a current block video data, that are coded using a linear model coding mode, and dynamically changing a code word used to indicate a particular type of the linear model coding mode based on the determined number of neighboring chroma blocks of the video data coded using the linear model coding mode.

In one example, a device for coding video data comprises a memory storing video data, and a video coder comprising one or more processors configured to determine a number of neighboring chroma blocks, relative to a current block vide data, that are coded using a linear model coding mode, and dynamically change a code word used to indicate a particular type of the linear model coding mode based on the determined number of neighboring chroma blocks of the video data coded using the linear model coding mode.

In one example, a method of coding video data comprises determining a size of a current chroma block of the video data, comparing the size of the current chroma block to a threshold, applying a linear model mode of a plurality of linear model modes when the size of the current chroma block satisfies the threshold, and not applying the linear model mode of the plurality of linear model modes when the size of the current chroma block does not satisfy the threshold.

In one example, a device for coding video data comprises a memory storing video data, and a video coder comprising one or more processors configured to determine a size of a current chroma block of the video data, compare the size of the current chroma block to a threshold, apply a linear model mode of a plurality of linear model modes when the size of the current chroma block satisfies the threshold, and not apply the linear model mode of the plurality of linear model modes when the size of the current chroma block does not satisfy the threshold.

Linear Model (LM) chroma intra prediction was proposed to the JCT-VC in Chen, et al., "CE6.a.4: Chroma intra prediction by reconstructed luma samples," Joint Collaborative Team on Video Coding (JCT-VC) of ITU-T SG16 WP3 and ISO/IEC JTC1/SC29/WG1, 5th Meeting: Geneva, 16-23 Mar. 2011, JCTVC-E266, which is available at http://phenix.int-evry.fr/jct/doc_end_user/documents/5_Geneva/wg11/JCTVC-E0266-v4.zip. LM mode has also been proposed to JVET, and is described in Section 2.2.4 of Chen, et al., "*Algorithm Description of Joint Exploration Test Model 3*," Joint Video Exploration Team (JVET) of ITU-T SG 16 WP 3 and ISO/IEC JTC 1/SC 29/WG 11 3rd Meeting: Geneva, CH, 26 May-1 Jun. 2016, JVET-C1001, and which is available at http://phenix.int-evry.fr/jvet/doc_end_user/documents/3_Geneva/wg11/JVET-C1001-v3.zip. LM mode supposes there is linear relationship between the luma and chroma components of a block of video. When coding video data according to LM mode, video encoder 20 (e.g., intra prediction unit 46) and video decoder 30 (e.g., intra prediction unit 74) may be configured to analyze the neighboring reconstructed pixels of a block of video data by utilizing the linear regression approach to determine the relationship between luma samples and chroma samples. When LM mode is used, video encoder 20 and video decoder 30 may be configured to predict the chroma values (e.g., both Cr and Cb chroma samples) from reconstructed luma values of same block as follows.

$$Pred_C[x,y] = \alpha \cdot Rec_L'[x,y] + \beta \quad (1)$$

where $Pred_C$ indicates the prediction of chroma samples in a block and $Rec_L$ indicates the reconstructed luma samples in the block. Parameters $\alpha$ and $\beta$ are derived from causal reconstructed samples neighboring the current block.

In some examples, the sampling ratio of chroma components is half of that of luma component and the chroma components have 0.5 pixel phase difference in the vertical direction in YUV420 sampling (e.g., also called 4:2:0 chroma sub-sampling). Reconstructed luma samples are down-sampled in the vertical direction and subsampled in horizontal direction to match size and phase of the chroma signal (i.e., the expected number of chroma components in a block), as follows:

$$Rec_L'[x,y] = (Rec_L[2x,2y] + Rec_L[2x,2y+1]) >> 1 \quad (2)$$

where >> is a logical right shift.

One example of LM utilizes a linear least square solution between causal reconstructed data of a down-sampled luma component and a causal chroma component to derive linear model parameters $\alpha$ and $\beta$. For example, model parameters $\alpha$ and $\beta$ may be derived as follows:

$$\alpha = \frac{I \cdot \sum_{i=0}^{I} Rec_C(i) \cdot Rec_L'(i) - \sum_{i=0}^{I} Rec_C(i) \cdot \sum_{i=0}^{I} Rec_L'(i)}{I \cdot \sum_{i=0}^{I} Rec_L'(i) \cdot Rec_L'(i) - \left(\sum_{i=0}^{I} Rec_L'(i)\right)^2} = \frac{A_1}{A_2} \quad (3)$$

$$\beta = \frac{\sum_{i=0}^{I} Rec_C(i) - \alpha \cdot \sum_{i=0}^{I} Rec_L'(i)}{I} \quad (4)$$

where $Rec_C(i)$ and $Rec_L'(i)$ indicate reconstructed chroma samples and down-sampled luma samples neighboring the target block, and I indicates total number of samples of neighboring data.

Figure 4:
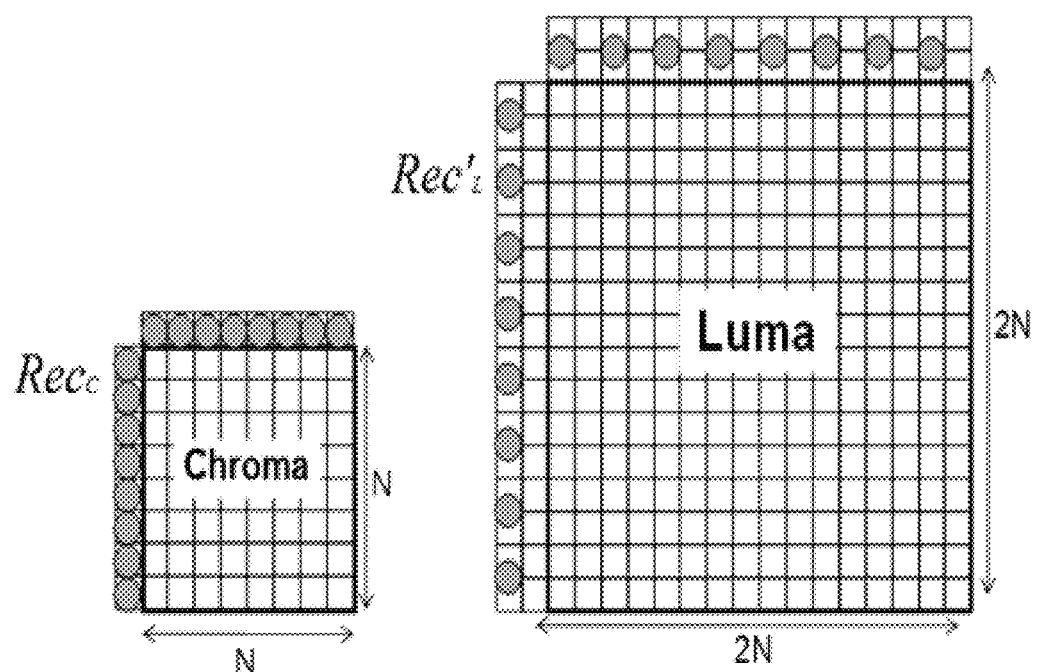
FIG. 4 is a conceptual diagram of example locations of samples used for deriving model parameter $\alpha$ and model parameter $\beta$ for linear model chroma intra prediction.

FIG. 4 is a conceptual diagram illustrating locations of samples used for deriving model parameter $\alpha$ and model parameter $\beta$. As illustrated in FIG. 4, only left and above causal samples marked as gray circles are involved in the calculation of model parameter $\alpha$ and model parameter $\beta$ to keep total samples number I as power of 2. For a target N×N chroma block, when both left and above causal samples are available, the total number of involved samples is 2N; when only left or above causal samples are available, the total number of involved samples is N.

Figure 5:
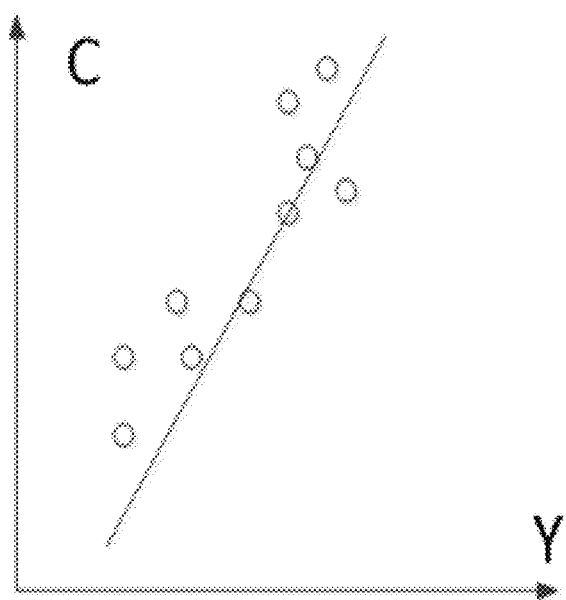
FIG. 5 is a graph of an example of linear regression between luma (Y) components and chroma (C) components.

FIG. 5 is a graph of an example of linear regression between luma (Y) components and chroma (C) components. As illustrated in FIG. 5, according to one example, a linear relationship between luma and chroma components may be solved using a linear regression method. In FIG. 5, a point on the conceptual diagram corresponds to a pair of the sample $Rec_L'[x,y], Rec_C[x,y]$).

Figure 6:
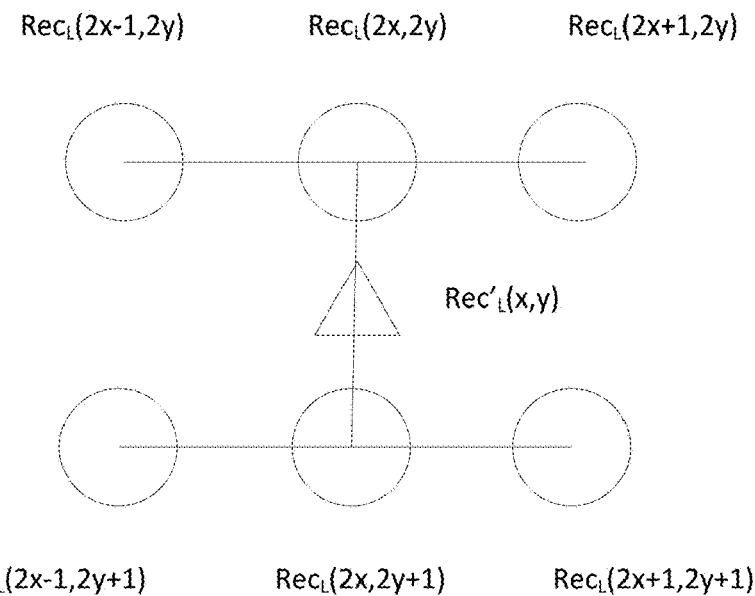
FIG. 6 is a conceptual diagram of an example of luma sample down-sampling.

FIG. 6 is a conceptual diagram illustrating an example of luma sample down-sampling in JEM3.0. In the example of FIG. 6, the triangle symbols represent a down-sampled luma value, while the circle symbols represent the original reconstructed luma samples (i.e., before any down-sampling). The lines represent which of the original luma samples are used to create a down-sampled luma value according to each specific down-sampling filter. In one example, JVET uses a more sophisticated luma sample down-sampling filter for LM mode in JEM3.0, as illustrated in FIG. 6 of this disclosure, where $$Rec_L'[x,y] = \\ (2 \cdot Rec_L[2x,2y] + 2 \cdot Rec_L[2x,2y+1] + Rec_L[2x-1,2y] + Rec_L[2x+1, \\ 2y] + Rec_L[2x-1,2y+1] + Rec_L[2x+1,2y+1] + 4) >> 3$$

When the samples are located at the picture boundary, a two-tap filter may be applied as shown in equation (2), above.

Previous techniques for LM chroma prediction used a single linear regression model for predicting chroma values from reconstructed luma values. However, this approach may have drawbacks for certain video sequences. For example, the relationship between luma and chroma samples may not be linear across all possible luma values. As such, LM chroma prediction may introduce undesirable amounts of distortion in the decoded video in some examples. This may be especially true for blocks of video data having a wide range of luma values. This disclosure describes techniques for performing LM chroma prediction, including techniques for luma sub-sampling, and a combined LM chroma prediction and angular prediction mode. The techniques of this disclosure may improve the visual quality of video data encoded and decoded using a LM chroma prediction mode.

In some examples, this disclosure describes the concept of multiple luma sub-sampling filters. In one example, when LM chroma prediction mode is enabled, one or more sets of the down-sampling filter may be further signaled in either a sequence parameter set (SPS), a picture parameter set (PPS), or a slice header. In one example, a Supplemental Enhancement Information (SEI) message syntax may be introduced to describe the down-sampling filter. In one example, a default down-sampling filter may be defined, e.g., the 6-tap filter [1, 2, 1; 1, 2, 1] without signaling. In one example, video encoder 20 may signal an index of the filter that is used in LM prediction mode in one PU/CU/largest CU. In one example, the usage of the filter tap may be derived on-the-fly without signaling. For example, video decoder 30 may be configured to determine the usage of the filter tap from characteristics of the encoded video bitstream and/or coding modes without explicit signaling.

As will be described in further detail below, this disclosure describes a Multi-model LM (MMLM) method, a Multi-filter LM (MFLM) method, and a LM-Angular Prediction (LAP), each of which may be utilized, alone or in any combination.

In one example, when an MMLM method is utilized, video encoder 20 and video decoder 30 may be configured to use more than one linear model (e.g., multiple linear models), for a single block/coding unit (CU)/transform unit (TU), to predict chroma components of the block from luma components of the block. Video encoder 20 and video decoder 30 may be configured to derive the multiple linear models using neighboring luma samples and neighboring chroma samples.

Neighboring luma samples and neighboring chroma samples of the current block may be classified into several groups based on the values of the samples. Each group is used as a training set to derive a different linear model (i.e., a particular $\alpha$ and $\beta$ are derived for each particular group).

In one example, furthermore, video encoder 20 and video decoder 30 are configured to classify the samples of the corresponding current luma block (i.e., the luma block corresponding to the current chroma block) based on the same rule for the classification of neighboring samples.

In one example, video encoder 20 and video decoder 30 are configured to apply each linear model to the corresponding classified luma samples in order to obtain partial predicted chroma blocks. Video encoder 20 and video decoder 30 are configured to combine each partial predicted chroma block obtained from each of the linear models to obtain the final predicted chroma block. In another example, video encoder 20 and video decoder 30 may be configured to apply each linear model to all of the luma samples of the current block to obtain multiple predicted chroma blocks. Video encoder 20 and video decoder 30 may then apply a weighted average to each of the multiple predicted chroma blocks to obtain a final predicted chroma block.

In some examples, video encoder 20 and video decoder 30 may be configured to require that the number of samples in a group after the classification is larger than or equal to a specific number (e.g., at least 2 samples per classification group). In one example, the fewest number of samples in one classification group is pre-defined and the same value is used for all block sizes. In another example, the fewest number of samples in one classification group may be variable, and may depend on the size of the current block, and/or may depend on other features (e.g., which classification group includes the fewest number of samples may depend on the prediction mode(s) of neighboring blocks). If the number of samples in a group is smaller than the minimum defined for a certain block, samples in other groups can be changed to this group (e.g., samples from adjacent classification groups may be combined). For example, a sample in the group with the most samples can be changed to the group with samples less than the defined minimum number for the block.

In one example, a sample in a group (named group A) with the most samples can be changed to a group (named group B) with samples less than the defined minimum number for the block if it is the nearest sample to the existing sample in group B. In one example, "nearest" may refer to the nearest in pixel position. In another example, "nearest" may refer to the nearest intensity (e.g., chroma or luma value). In another example, the defined minimum number for the block may be dependent on the width and/or height of the coding block.

In one example, classification of neighboring luma and chroma samples may be based on intensities of the samples (e.g., values of the luma and/or chroma neighboring samples) and/or positions of the neighboring luma and/or chroma samples. In one example, video encoder 20 may be configured to signal syntax elements to video decoder 30 which indicate the classification method to be used.

In one example, the number of classes may be pre-defined and fixed for all video sequences. In one example, video encoder 20 may be configured to signal the number of classes in an encoded video bitstream to video decoder 30 in one or more of a PPS, SPS, and/or slice header. In one example, the number of classes may be dependent on the block size, e.g., width and/or height of the current luma/chroma block. An example of M classes for MMLM is given as follows:

$$\begin{cases} Pred_c[x, y] = \alpha_1 \cdot Rec'_L[x, y] + \beta_1 & \text{if } Rec'_L[x, y] \leq T_1 \\ Pred_c[x, y] = \alpha_2 \cdot Rec'_L[x, y] + \beta_2 & \text{if } T_1 < Rec'_L[x, y] \leq T_2 \\ \ldots & \ldots \\ Pred_c[x, y] = \alpha_m \cdot Rec'_L[x, y] + \beta_m & \text{if } T_{m-1} < Rec'_L[x, y] \leq T_m \\ \ldots & \ldots \\ Pred_c[x, y] = \alpha_M \cdot Rec'_L[x, y] + \beta_M & \text{if } T_{M-1} < Rec'_L[x, y] \end{cases}$$

In the example above, $T_1$–$T_{M-1}$ are threshold levels for each classification group, and thus, the threshold levels for each corresponding linear model $Pred_c[x,y]=\alpha_M \cdot Rec'_L[x,y]+\beta_M$. In the example above, the thresholds may be defined as values of luma samples. A neighboring luma sample ($Rec'_L[x,y]$) with a value between two consecutive thresholds (e.g., $T_{M-1}<Rec'_L[x,y]$ is classified into the m-th group (wherein m is from 1 to M, inclusively). In one example, $T_{-1}$ may be defined as a negative value, e.g., −1. The (M−1) thresholds denoted by ($T_1 \ldots T_{M-1}$) may be signaled from video encoder 20 to video decoder 30. In other examples, the thresholds may be predefined and stored at each of video encoder 20 and video decoder 30

In one example, video encoder 20 and video decoder 30 may be configured to calculate the thresholds depending on all or a partial subset of the neighboring coded luma/chroma samples, and/or the coded luma samples in the current block.

Figure 7A:
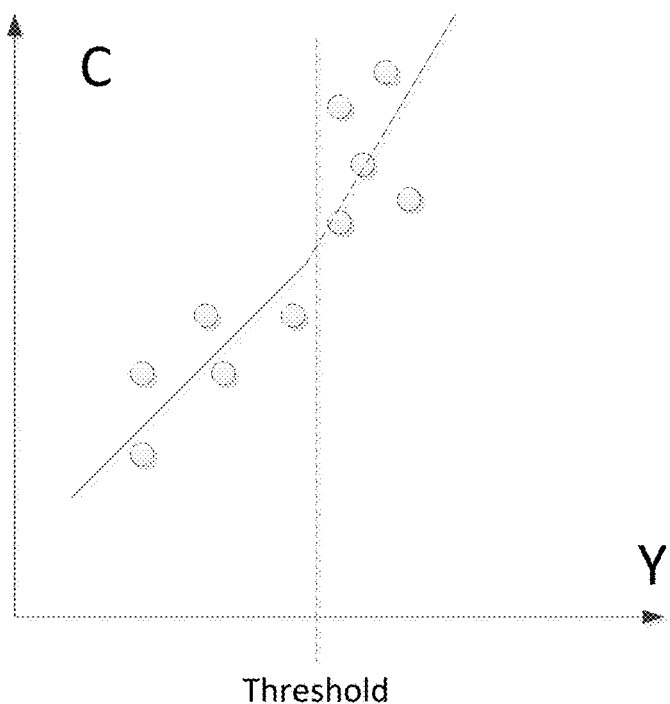
FIGS. 7A-7E are graphs of classifying of neighboring samples according to examples of this disclosure.
Figure 7B:
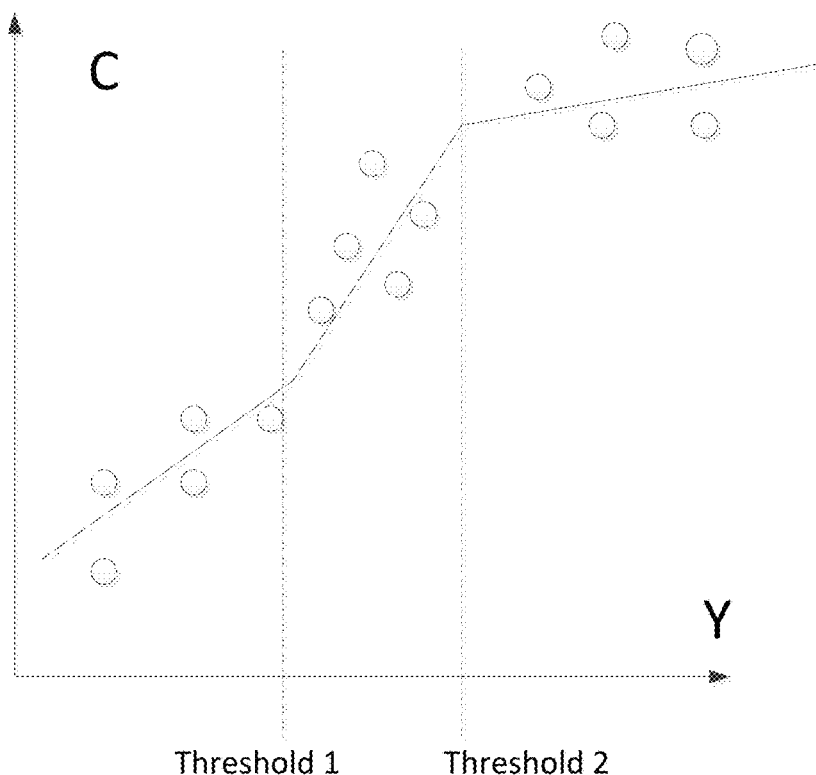
Figure 7C:
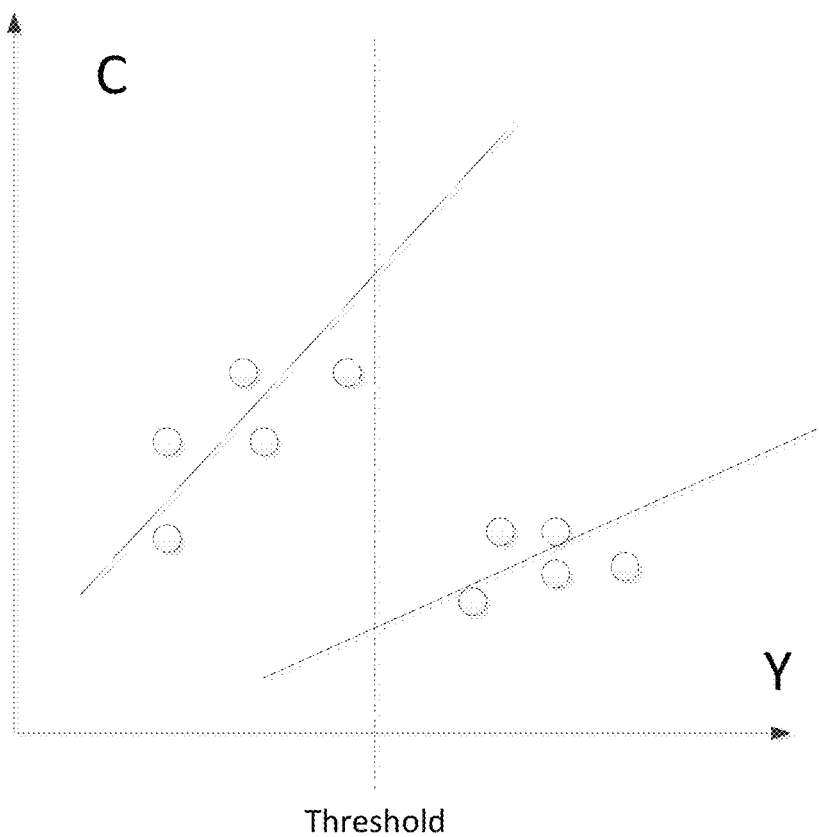
Figure 7D:
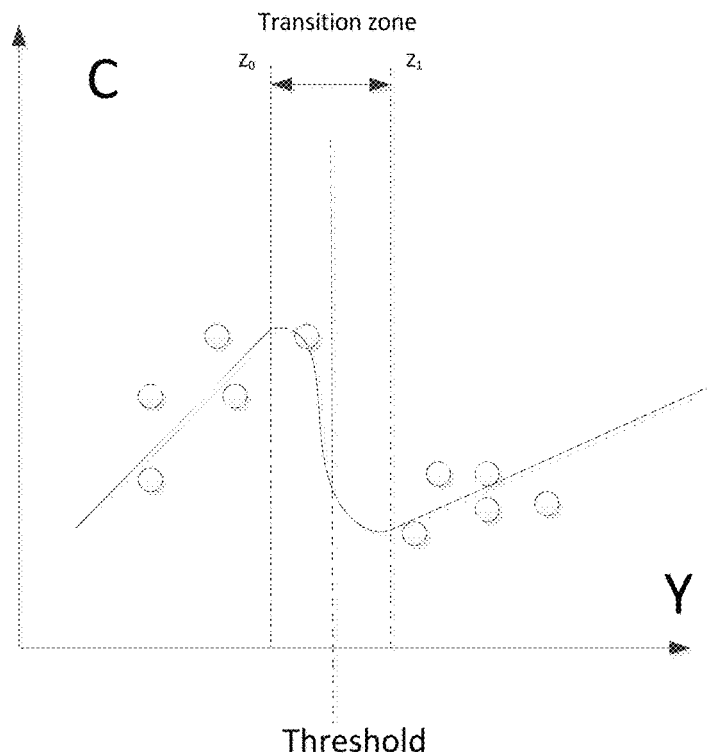
Figure 7E:
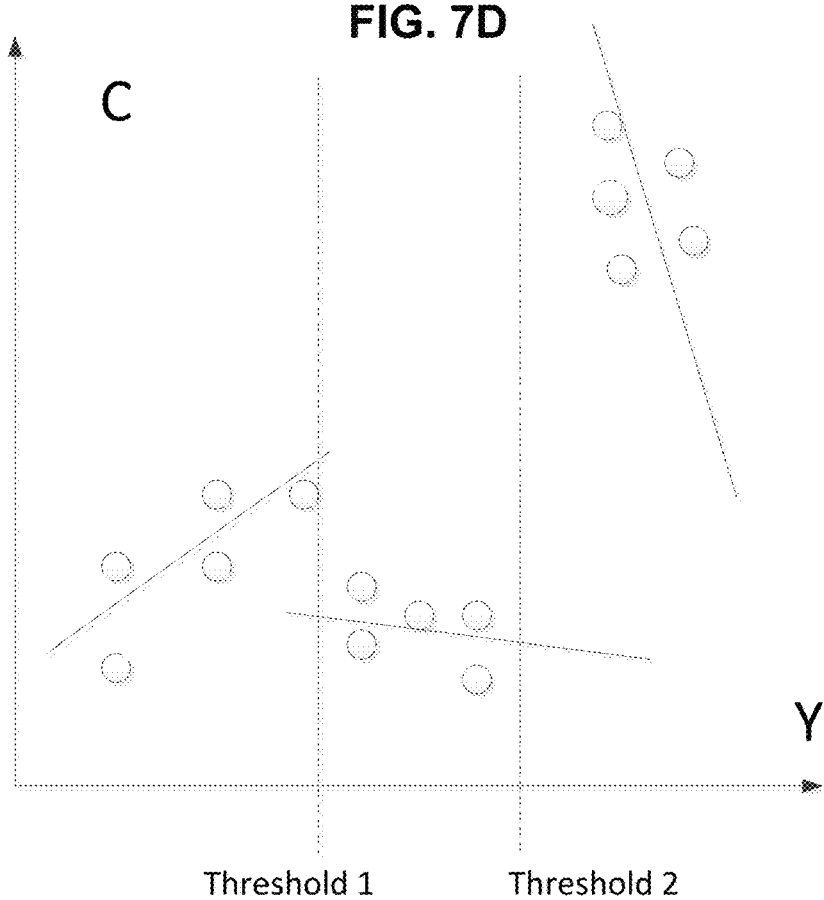

FIGS. 7A-7E are graphs depicting the classification of neighboring samples into multiple groups, and the determination of a linear model for each group according to examples of this disclosure. Classification of neighboring samples into two groups is illustrated in FIG. 7A, classification of neighboring samples into three groups is illustrated in FIG. 7B, and classification of neighboring samples into two or more, non-continuous groups is illustrated in FIGS. 7C-7E. In some examples, the definition or calculation of thresholds may differ under different M values (e.g., different threshold values depending on the number of groups, and thus the number of linear models).

In one example, as illustrated in FIG. 7A, when M is equal to 2, neighboring samples may be classified into two groups. A neighboring sample with $Rec'_L[x,y]$ Threshold may be classified into group 1; while a neighboring sample with $Rec'_L[x,y]$>Threshold may be classified into group 2. Video encoder 20 and video decoder 30 may be configured to derive two linear models (one for each group) as follows:

$$\begin{cases} Pred_C[x, y] = \alpha_1 \cdot Rec'_L[x, y] + \beta_1 & \text{if } Rec'_L[x, y] \leq Threshold \\ Pred_C[x, y] = \alpha_2 \cdot Rec'_L[x, y] + \beta_2 & \text{if } Rec'_L[x, y] > Threshold \end{cases} \quad (6)$$

In one example in accordance with FIG. 7A (i.e., where two groups are classified), video encoder 20 and video decoder 30 may be configured to calculate the Threshold as the average value of the neighboring coded (also be denoted as 'reconstructed') luma samples. As discussed above, video encoder 20 and video decoder 30 may be configured to down-sample the reconstructed luma samples if the chroma components are sub-sampled (e.g., a chroma sub-sampling format other than 4:4:4 is used). In another example, video encoder 20 and video decoder 30 may be configured to calculate the Threshold as the median value of the neighboring coded Luma samples. In another example, video encoder 20 and video decoder 30 may be configured to calculate the Threshold as the average of minV and maxV, wherein minV and maxV are the minimum value and the maximum values, respectively, of the neighboring coded Luma samples (which may be down-sampled if not in 4:4:4 format). In another example, video encoder 20 and video decoder 30 may be configured to calculate the Threshold as the average value of the neighboring coded Luma samples and the coded Luma samples in the current block (which may be down-sampled if not in 4:4:4 format). In another example, video encoder 20 and video decoder 30 may be configured to calculate the Threshold as the median value of the neighboring coded Luma samples and the coded Luma samples in the current block (which may be down-sampled if not in 4:4:4 format). In another example, video encoder 20 and video decoder 30 may be configured to calculate the Threshold as the average of minV and maxV, wherein minV and maxV are the minimum value and the maximum values, respectively, of the neighboring coded Luma samples and the coded Luma samples in the current block (which may be down-sampled if not in 4:4:4 format).

In one example, as illustrated in FIG. 7B, when M is equal to 3, neighboring samples may be classified into three groups. A neighboring sample (e.g., luma sample) with $Rec'_L[x,y] \leq Threshold1$ may classified into group 1; a neighboring sample with $Threshold1 < Rec'_L[x,y] \leq Threshold2$ may be classified into group 2 and a neighboring sample with $Rec'_L[x,y] > Threshold2$ may be classified into group 3. Video encoder 20 and video decoder 30 may be configured to derive the three linear models as:

$$\begin{cases} Pred_C[x,y] = \alpha_1 \cdot Rec'_L[x,y] + \beta_1 & \text{if } Rec'_L[x,y] \leq Threshold1 \\ Pred_C[x,y] = \alpha_2 \cdot Rec'_L[x,y] + \beta_2 & \text{if } Threshold1 < Rec'_L[x,y] \leq Threshold2 \\ Pred_C[x,y] = \alpha_3 \cdot Rec'_L[x,y] + \beta_3 & \text{if } Rec'_L[x,y] > Threshold2 \end{cases} \quad (7)$$

In one example, video encoder 20 and video decoder 30 may be configured to calculate a Threshold using the methods described above for the case when M is equal to 2. Video encoder 20 and video decoder 30 may be further configured to calculate Threshold1 (e.g., as shown in FIG. 7B) as the average of minV and Threshold. Video encoder 20 and video decoder 30 may be configured to calculate Threshold2 (e.g., as shown in FIG. 7B) as the average of maxV and Threshold. The values of minV and maxV may be the minimum value and the maximum values, respectively, of the neighboring coded Luma samples (which may be down-sampled if not in 4:4:4 format).

In another example, video encoder 20 and video decoder 30 may be configured to calculate Threshold1 as ⅓ of sumV and Threshold2 may be calculated as ⅔ of sumV, where sumV is the accumulated sum value of the neighboring coded luma samples (maybe down-sampled if not in 4:4:4 format).

In another example, video encoder 20 and video decoder 30 may be configured to calculate Threshold1 as a value between S[N/3] and S[N/3+1] and Threshold2 may be calculated as a value between S[2*N/3] and S[2*N/3+1]. In this example, N may be the total number of the neighboring coded luma samples (which may be down-sampled if not in 4:4:4 format). S[0], S[1], . . . S[N−2], S[N−1] may be the ascending sorted sequence of neighboring coded luma samples (which may be down-sampled if not in 4:4:4 format).

In another example, video encoder 20 and video decoder 30 may be configured to calculate a Threshold value using any method described above for the case when M is equal to 2. Video encoder 20 and video decoder 30 may be further configured to calculate Threshold1 as the average of minV and Threshold. Video encoder 20 and video decoder 30 may be configured to calculate Threshold2 as the average of maxV and Threshold. In this example, the values of minV and maxV may be the minimum value and the maximum values, respectively, of both the neighboring coded luma samples (which may be down-sampled if not in 4:4:4 format) and the coded luma samples in the current block (which may be down-sampled if not in 4:4:4 format).

In another example, video encoder 20 and video decoder 30 may be configured to calculate Threshold1 as ⅓ of sumV. Video encoder 20 and video decoder 30 may be configured to calculate Threshold2 as ⅔ of sumV. In this example, sumV may be the accumulated sum value of both the neighboring coded luma samples (which may be down-sampled if not in 4:4:4 format) and the coded luma samples in the current block (which may be down-sampled if not in 4:4:4 format).

In another example, video encoder 20 and video decoder 30 may be configured to calculate Threshold1 as a value between S[N/3] and S[N/3+1] and Threshold2 may be calculated as S[2*N/3] and S[2*N/3+1]. In this example, N may be the total number of the neighboring coded luma samples (which may be down-sampled if not in 4:4:4 format) and the coded Luma samples in the current block (which may be down-sampled if not in 4:4:4 format). S[0], S[1], . . . S[N−2], S[N−1] may be the ascending sorted sequence of neighboring coded luma samples (which may be down-sampled if not in 4:4:4 format) and the coded luma samples in the current block (which may be down-sampled if not in 4:4:4 format).

In one example, the derived linear relationships (represented as lines in FIGS. 7A-7E) of each group may be continuous piece-wise as in FIG. 7A and FIG. 7B, where the linear models for adjacent groups result in the same value at the various thresholds, as shown in equations (8) and (9) below:

$$\alpha_1 \cdot Rec'_L[x,y] + \beta_1 = \alpha_2 \cdot Rec'_L[x,y] + \beta_2 \text{ if } Rec'_L[x,y] = Threshold \quad (8)$$

in FIG. 7A, and $$\begin{cases} \alpha_1 \cdot Rec'_L[x,y] + \beta_1 = \\ \alpha_2 \cdot Rec'_L[x,y] + \beta_2 & \text{if } Rec'_L[x,y] = Threshold1 \\ \alpha_2 \cdot Rec'_L[x,y] + \beta_2 = \\ \alpha_3 \cdot Rec'_L[x,y] + \beta_3 & \text{if } Rec'_L[x,y] = Threshold2 \end{cases} \quad (9)$$

in FIG. 7B.

In another example, the derived linear relationships of each group may be non-continuous, piece-wise as in FIG. 7C and FIG. 7E, where the linear models for adjacent groups do not result in the same value at the various thresholds, as shown in equations (10) and (11) below $$\alpha_1 \cdot Rec'_L[x,y] + \beta_1 \neq \alpha_2 \cdot Rec'_L[x,y] + \beta_2 \text{ if } Rec'_L[x,y] = Threshold \quad (10)$$

in FIG. 7C, and $$\begin{cases} \alpha_1 \cdot Rec'_L[x,y] + \beta_1 \neq \\ \alpha_2 \cdot Rec'_L[x,y] + \beta_2 & \text{if } Rec'_L[x,y] = Threshold1 \\ \alpha_2 \cdot Rec'_L[x,y] + \beta_2 \neq \\ \alpha_3 \cdot Rec'_L[x,y] + \beta_3 & \text{if } Rec'_L[x,y] = Threshold2 \end{cases} \quad (11)$$

in FIG. 7E.

To convert non-continuous piece-wise linear models (e.g., the non-continuous piece-wise linear models shown in FIG. 7C) to continuous piece-wise linear models, video encoder 20 and video decoder 30 may be configured to generate a transition zone between two thresholds. The segment of the linear model in the transition zone connects the original linear models. In this case, a non-continuous two model relationship results in a three-model relationship (as shown in FIG. 7D) after conversion. Video encoder 20 and video decoder 30 may be configured to derive the boundaries of the transition zone ($Z_o$ to $Z_1$ in FIG. 7D) based on the value of original thresholds for the classification and the values of the neighboring samples and/or the values for the current block samples.

In the example with a transition zone, the linear models may be defined as follows:

$$Pred_C[x,y]=(\omega_1\Box(\alpha_1 \cdot Rec'_L[x,y]+\beta_1)+\omega_2\Box(\alpha_2 \cdot Rec'_L[x,y]+\beta_2))/s$$

if $Rec'_L[x,y]$ is in the transition zone $[Z_0, Z_1]$.
In one example, $$s=Z_1-Z_0, \omega_1=Z_1-Rec'_L[x,y], \omega_2=s-\omega_1.$$

In one example, $$s=2^n=Z_1-Z_0, \omega_1=Z_1-Rec'_L[x,y], \omega_2=s-\omega_1$$

$$Pred_C[x,y]=(\omega_1\Box(\alpha_1 \cdot Rec'_L[x,y]+\beta_1)+\omega_2\Box(\alpha_2 \cdot Rec'_L[x,y]+\beta_2)+2^{n-1})>>n$$

The converted continuous piece-wise linear models may be used to replace the non-continuous continuous piece-wise linear models, or may be inserted as additional LM prediction modes.

Figure 8A:
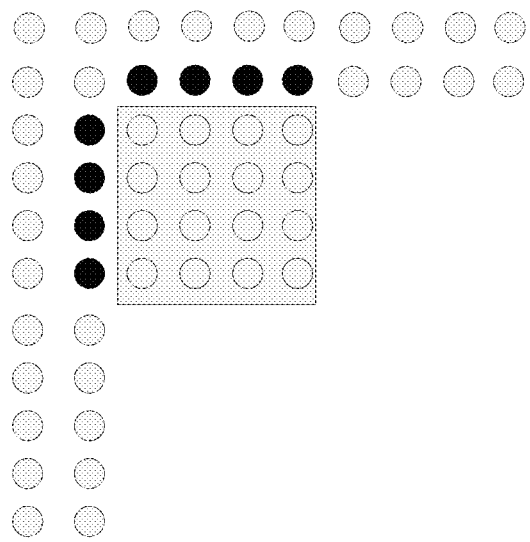
FIGS. 8A-8D are conceptual diagrams of neighboring chroma samples used to derive linear models according to examples of this disclosure.
Figure 8B:
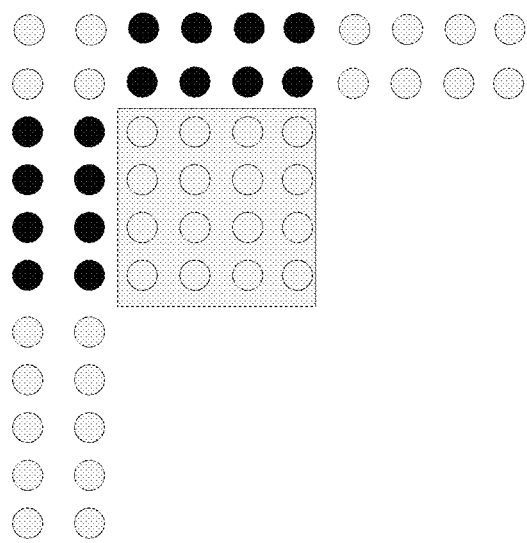
Figure 8C:
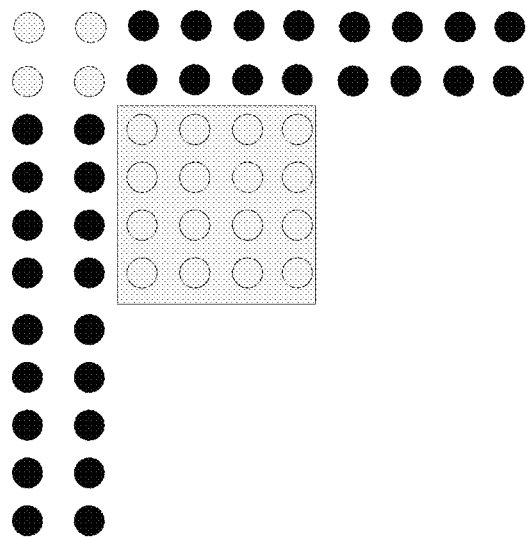
Figure 8D:
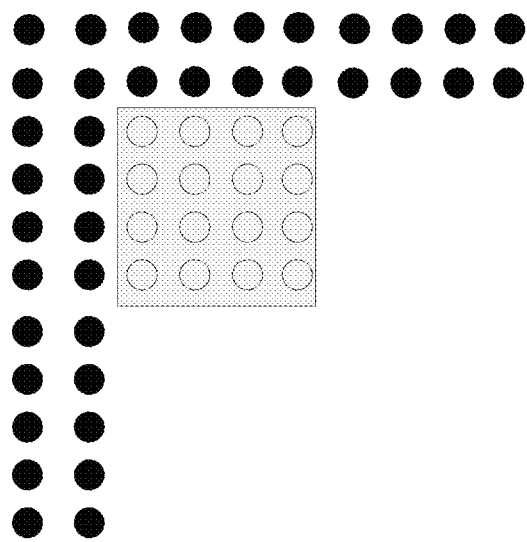

With the MMLM techniques of this disclosure, more neighboring luma and/or chroma samples may be used to derive the linear models relative to earlier LM prediction mode techniques. FIG. 8A shows the neighboring chroma samples that are used in previous examples of LM mode. The same neighboring chroma samples may be used for the MMLM techniques of this disclosure. FIGS. 8B-8D are conceptual diagrams of other example groups of neighboring chroma samples used to derive the linear models in MMLM mode according to examples of this disclosure. In FIGS. 8B-8D, more neighboring samples are used to derive the linear-models in MMLM relative to FIG. 8A. The black dots in FIGS. 8A-8D represent the neighboring chroma samples that are used to derive the two or more linear models of the MMLM techniques of this disclosure. The white dots outside of the block show other neighboring chroma samples that are not used. The white dots inside the box represent chroma samples of the block to be predicted. Corresponding down-sampled luma samples may also be used to derive the linear models.

Figure 9:
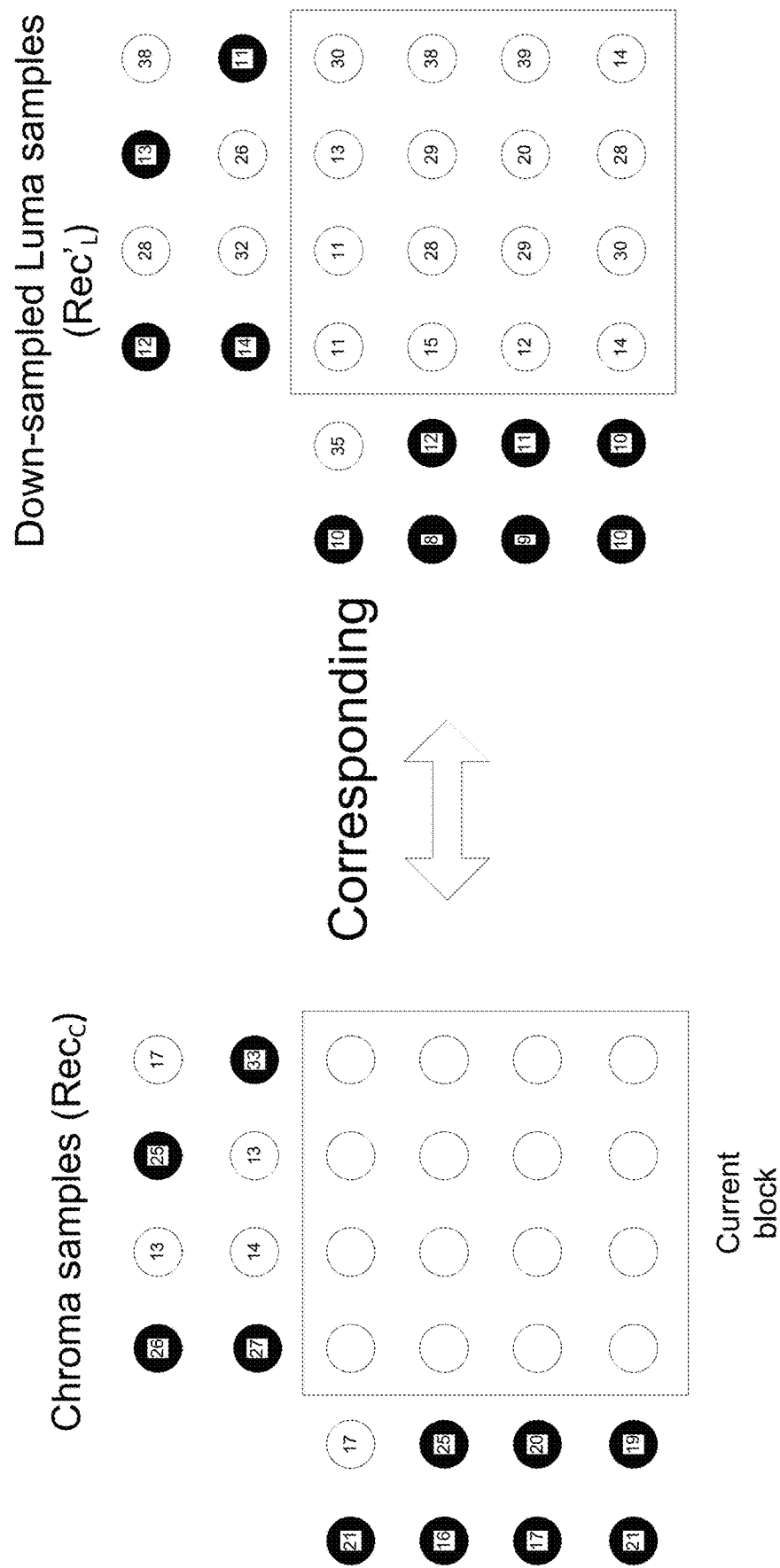
FIG. 9 is a conceptual diagram of neighboring sample classification according to examples of this disclosure.

FIG. 9 is a conceptual diagram of neighboring sample classification according to one example of the MMLM techniques of this disclosure. FIG. 9 illustrates a 4×4 current coding chroma block ($Rec_C$) with coded neighboring chroma samples, and corresponding coded luma samples ($Rec'_L$, which may be down-sampled if not in the 4:4:4 format) in the current block and neighboring blocks. According to one example, in MMLM mode, video encoder 20 and video decoder 30 may be configured to classify the neighboring coded luma samples into groups. In the example of FIG. 9, the neighboring coded luma samples are classified into two groups. A neighboring luma sample with $Rec'_L[x,y] \leq$ Threshold may be classified into group 1; while a neighboring sample with $Rec'_L[x,y] >$ Threshold may be classified into group 2. In this example, the threshold may be 17, for example. Video encoder 20 and video decoder 30 may be configured to classify the neighboring chroma samples according to the classification of the corresponding neighboring luma samples. That is, a corresponding chroma sample is classified into the same group as the corresponding luma sample in the same position.

As shown in FIG. 9, each of the luma samples, both in the current block and the neighboring luma samples, has an associated luma value depicted in each circle. The neighboring luma values that are less than or equal to the threshold (in this case 17), are shaded black (group 1). The luma values that are greater than the threshold are left white, i.e., unshaded (group 2). The neighboring chroma samples are classified into group 1 and group 2 based on the classifications of the corresponding luma samples in the same positions.

Figure 10:
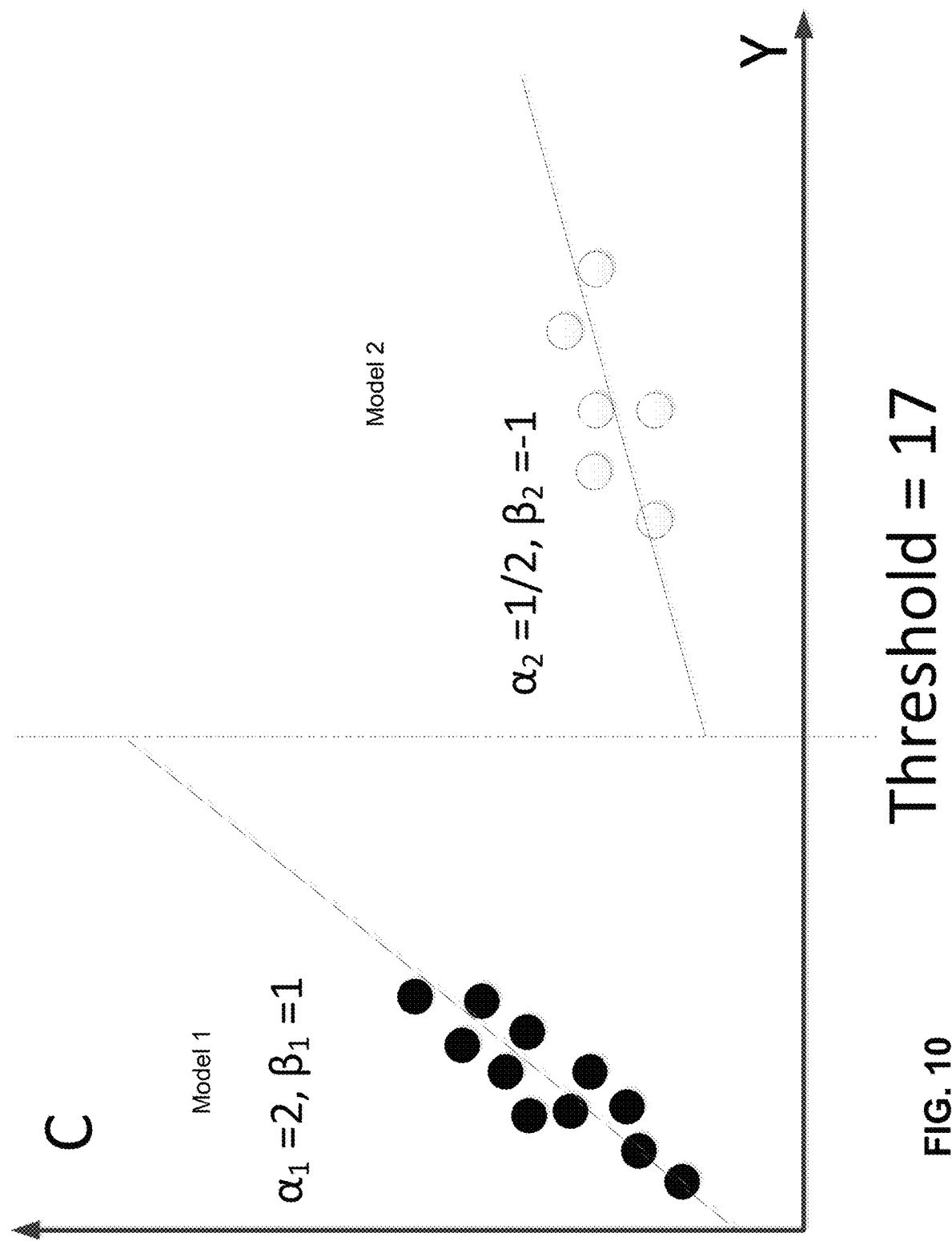
FIG. 10 is a conceptual diagram of two linear models for neighboring coded luma samples classified into 2 groups according to examples of this disclosure.

FIG. 10 is a conceptual diagram of two linear models for neighboring coded luma samples that are classified into 2 groups. After neighboring samples are classified into two groups (e.g., as shown in FIG. 9), video encoder 20 and video decoder 30 may be configured to derive two independent linear models, separately, on the two groups as depicted in FIG. 10. In this example, the two linear models may be obtained for the two classes as $$\begin{cases} Pred_C[x,y] = 2 \cdot Rec'_L[x,y] + 1 & \text{Model 1} \\ Pred_C[x,y] = \frac{1}{2} \cdot Rec'_L[x,y] - 1 & \text{Model 2} \end{cases}$$

The parameters for the linear models may be derived in the same manner as described above, where parameters are derived for each linear model using the samples for the particular classification group for that model.

Figure 11:
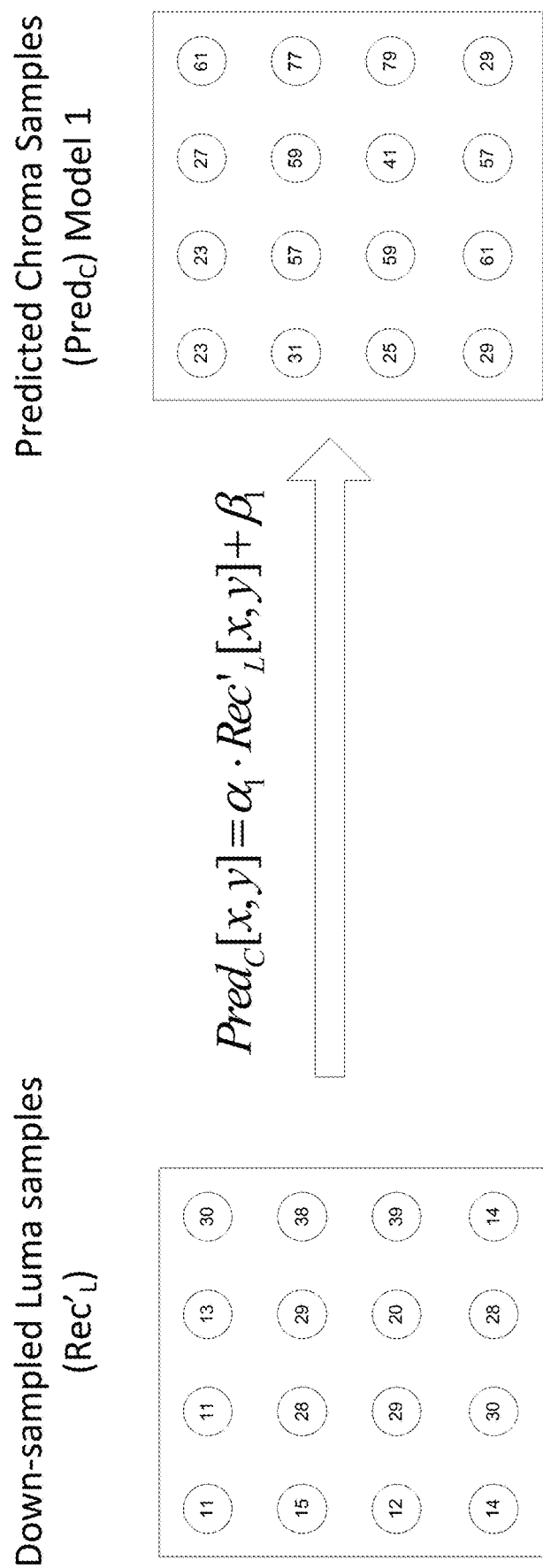
FIG. 11 is a conceptual diagram of applying one linear model, Model 1, of two linear models, to all pixels of a current block according to examples of this disclosure.
Figure 12:
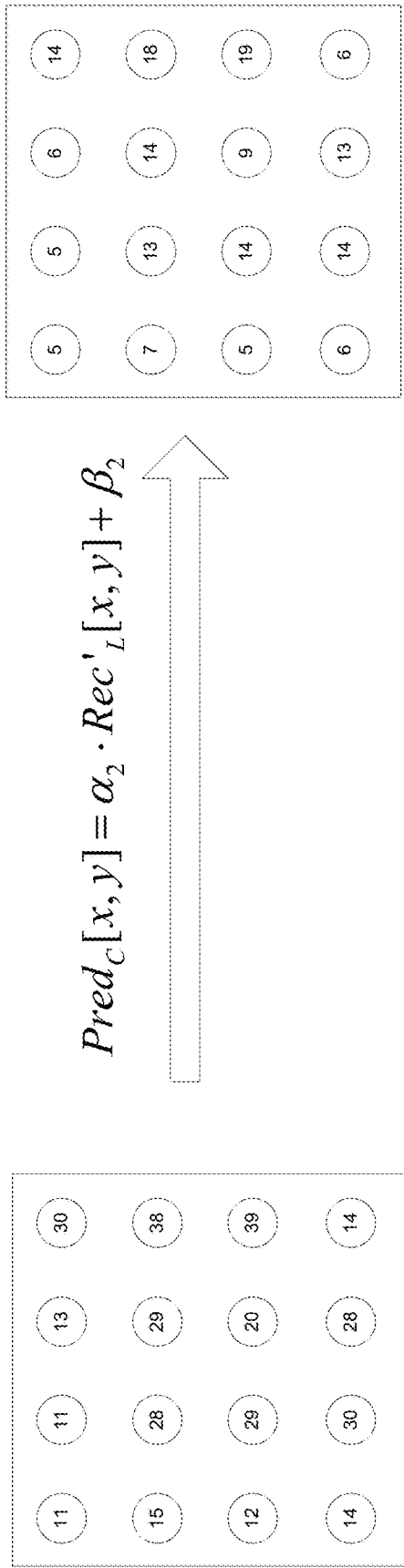
FIG. 12 is a conceptual diagram of applying another linear model, Model 2, of the two linear models, to all pixels of the current block according to examples of this disclosure.

FIG. 11 is a conceptual diagram of applying one linear model, Model 1, of two linear models, to all pixels of a current block. FIG. 12 is a conceptual diagram of applying another linear model, Model 2 of the two linear models, to all pixels of the current block. In one example, video encoder 20 and video decoder 30 may be configured to apply one of Model 1 or Model 2 to all of the samples of the down-sampled luma block ($Rec'_L$) corresponding to the currently coded chroma block, as shown in FIG. 11 and FIG. 12, respectively, to obtain the predicted chroma samples for the current block ($Pred_C$). In one example, video encoder 20 and video decoder 30 may be configured to form predicted chroma blocks with the two models in parallel. Then the final prediction can be attained by selecting the particular predicted chroma sample from the two predicted blocks based on the group classification for each position (i.e., based on the group classification of each luma value at each chroma position).

In another example, video encoder 20 and video decoder 30 may be configured to apply both Model 1 and Model 2 to the all of samples of the down-sampled luma block ($Rec'_L$) corresponding to the currently coded chroma block to obtain two versions of the predicted chroma samples for the current block ($Pred_C$). Video encoder 20 and video decoder 30 are further configured to compute a weighted average of the two versions of the predicted chroma samples. The weighted average of two prediction blocks (using Model 1 or Model 2) may be treated as the final prediction block of the current chroma block. Any weighting may be used. As one example, a 0.5/0.5 weighting may be used.

Figure 13:
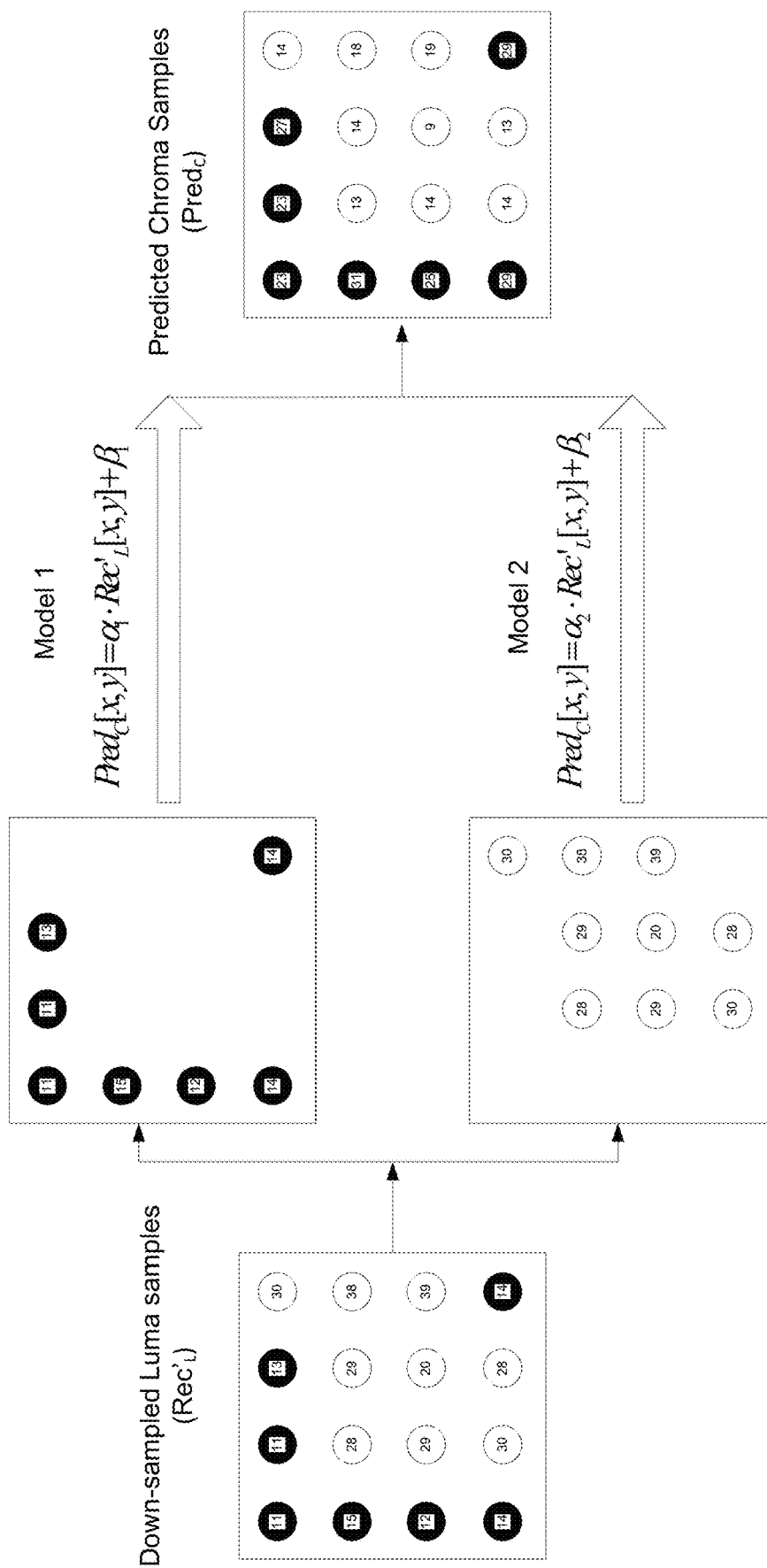
FIG. 13 is a conceptual diagram of a prediction procedure according to examples of this disclosure.

FIG. 13 is a conceptual diagram of another example prediction technique in accordance with the MMLM techniques of this disclosure. As illustrated in FIG. 13, video encoder 20 and video decoder 30 may first classify reconstructed luma samples (Rec'$_L$) in the current block. Video encoder 20 and video decoder 30 may be further configured to apply a first linear model (e.g., Model 1 of FIG. 10) to luma samples in the first classification group (represented by black circles in FIG. 13). Video encoder 20 and video decoder 30 may be further configured to apply a second linear model (e.g., Model 2 of FIG. 10) to luma samples in a second classification group (represented by white circles in FIG. 13).

In the example of FIG. 13, coded luma samples (down-sampled if not in the 4:4:4 format) may be classified into two groups depending on the intensities (e.g., values) of the samples. A luma sample with a value less than or equal to the threshold (e.g., Rec'$_L$[x,y]≤Threshold) may be classified into group 1, while a luma sample with a value greater than the threshold (e.g., Rec'$_L$[x,y]>Threshold) may be classified into group 2. In this example, the threshold may be 17, which is calculated using the neighboring coded luma samples, as described above. In one example, the classification method for the reconstructed luma samples in the current block is the same as the classification method used for the coded neighboring luma samples.

As illustrated in FIG. 13, video encoder 20 and video decoder 30 may be configured to apply Model 1 to coded luma samples (down-sampled if not in the 4:4:4 format) in the current block in the first classification group (black circles) to derive the corresponding predicted chroma samples in the current block. Likewise, video encoder 20 and video decoder 30 may be configured to apply Model 2 to coded luma samples (down-sampled if not in the 4:4:4 format) in the current block in the second classification group (white circles) to derive the corresponding predicted chroma samples in the current block. As a result, the predicted chroma samples in the current block are derived according to two linear models. When there are more groups, more linear models may be used to obtain the predicted chroma samples.

In one example, video encoder 20 may signal the number of groups that the luma samples should be classified in to video decoder 30. If the number is 1, the original LM mode is utilized. In another example, an LM mode with a different number of groups may be treated as different LM modes. For example, LM-MM1 mode includes 1 group, LM-MM2 mode includes 2 groups, and LM-MM3 mode includes 3 groups. LM-MM1 may be identical to the original LM mode, while LM-MM2 and LM-MM3 may be performed according to the techniques of this disclosure. In still another example, video decoder 30 may derive the number of groups without video encoder 20 signaling the number of groups.

In another example of the disclosure, a Multi-Filter LM (MFLM) mode is described. In MFLM mode, more than one luma down-sampling filter may be defined if the video data is not in a 4:4:4 chroma sub-sampling format. For example, additional down-sampling filters, besides the down-sampling filters defined in JEM-3.0 (shown in FIG. 6 of this disclosure), may be used. The filters may be in a form of:

$$\text{Rec'}_L[x,y]=a\cdot\text{Rec}_L[2x,2y]+b\cdot\text{Rec}_L[2x,2y+1]+c\cdot\text{Rec}_L[2x-1,2y]+d\cdot\text{Rec}_L[2x+1,2y]+e\cdot\text{Rec}_L[2x-1,2y+1]+f\cdot\text{Rec}_L[2x+1,2y+1]+g, \quad (12)$$

where filter weights a, b, c, d, e, f, g are real numbers. or, $$\text{Rec'}_L[x,y]=(a\cdot\text{Rec}_L[2x,2y]+b\cdot\text{Rec}_L[2x,2y+1]+c\cdot\text{Rec}_L[2x-1,2y]+d\cdot\text{Rec}_L[2x+1,2y]+e\cdot\text{Rec}_L[2x-1,2y+1]+f\cdot\text{Rec}_L[2x+1,2y+1]+g)/h, \quad (13)$$

where filter weights a, b, c, d, e, f g, h are integer numbers. or $$\text{Rec'}_L[x,y]=(a\cdot\text{Rec}_L[2x,2y]+b\cdot\text{Rec}_L[2x,2y+1]+c\cdot\text{Rec}_L[2x-1,2y]+d\cdot\text{Rec}_L[2x+1,2y]+e\cdot\text{Rec}_L[2x-1,2y+1]+f\cdot\text{Rec}_L[2x+1,2y+1]+g)\gg h, \quad (14)$$

where filter weights a, b, c, d, e, f, g, h are integer numbers.

Figure 14A:
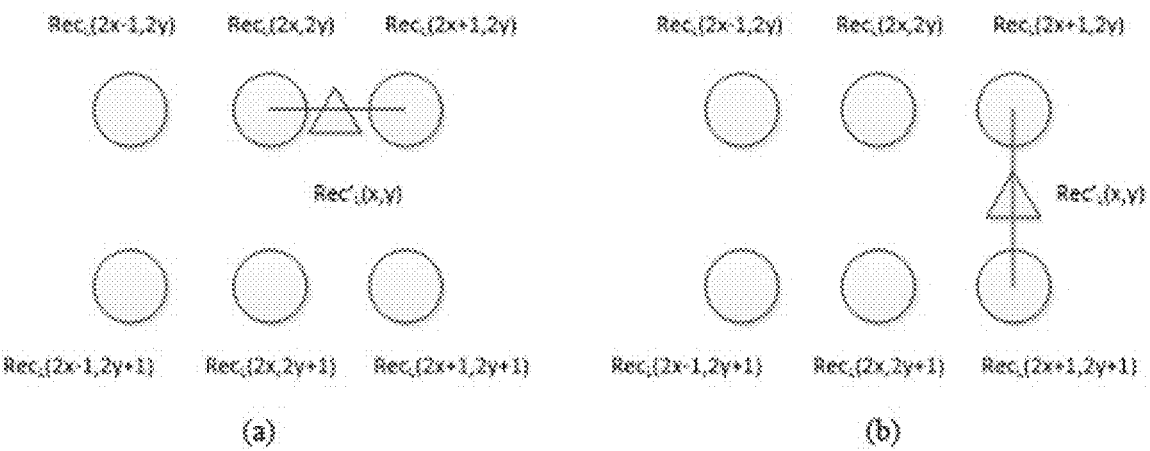
FIGS. 14A-14C are conceptual diagrams of luma sub-sampling filters according to an example of the present disclosure.
Figure 14A:
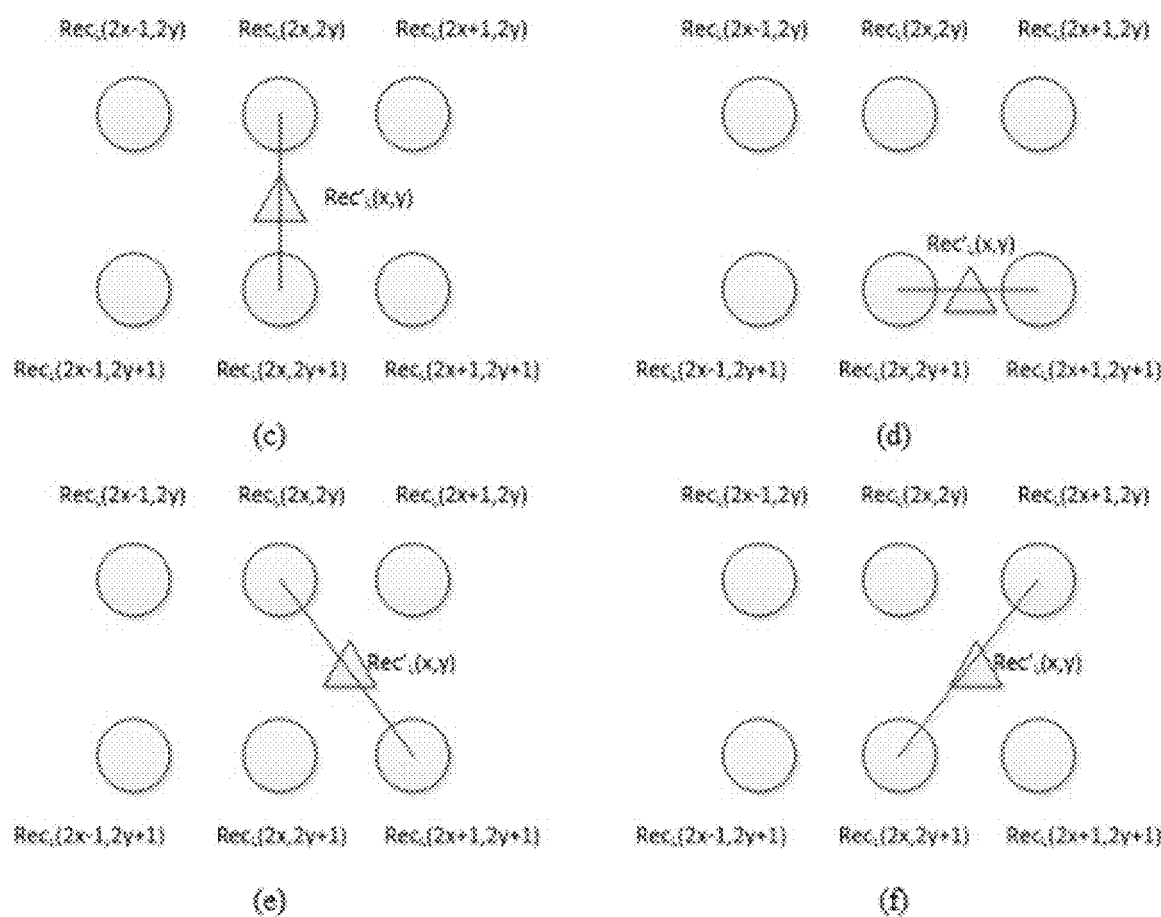
Figure 14B:
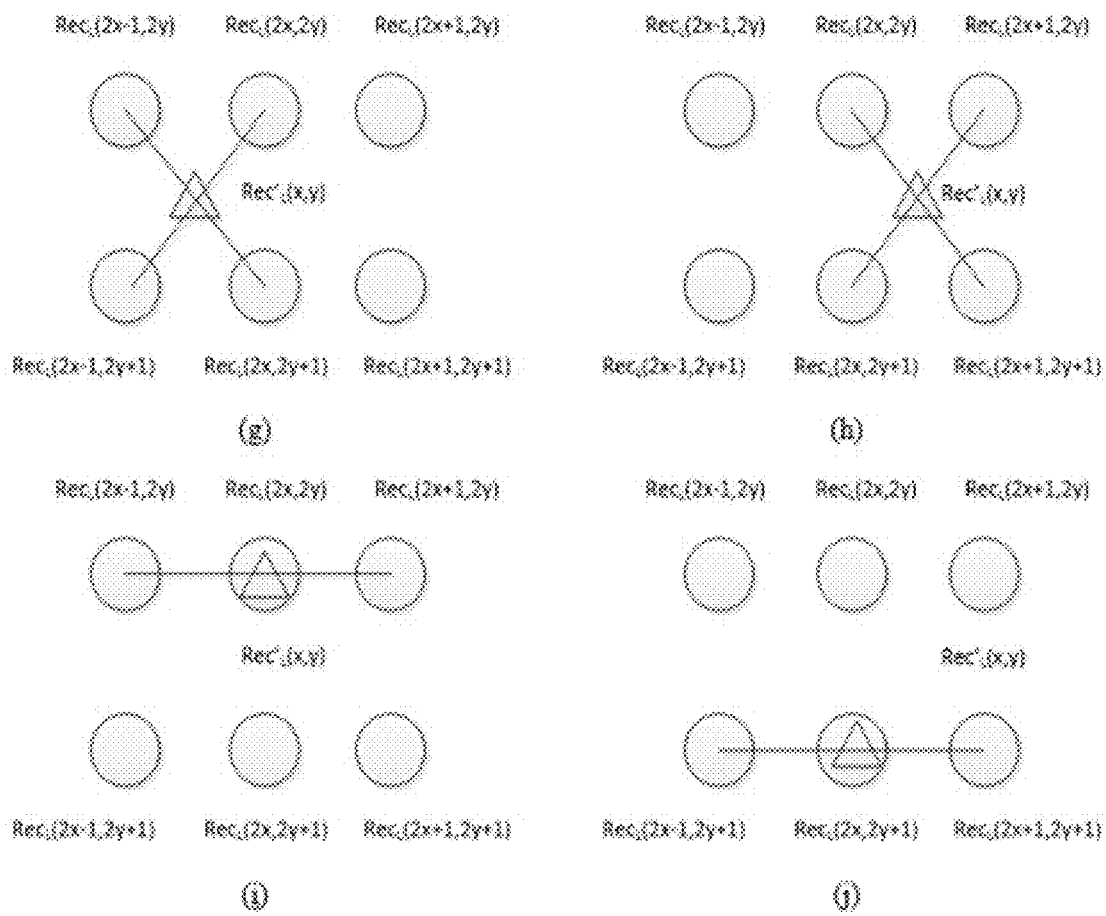
Figure 14B:
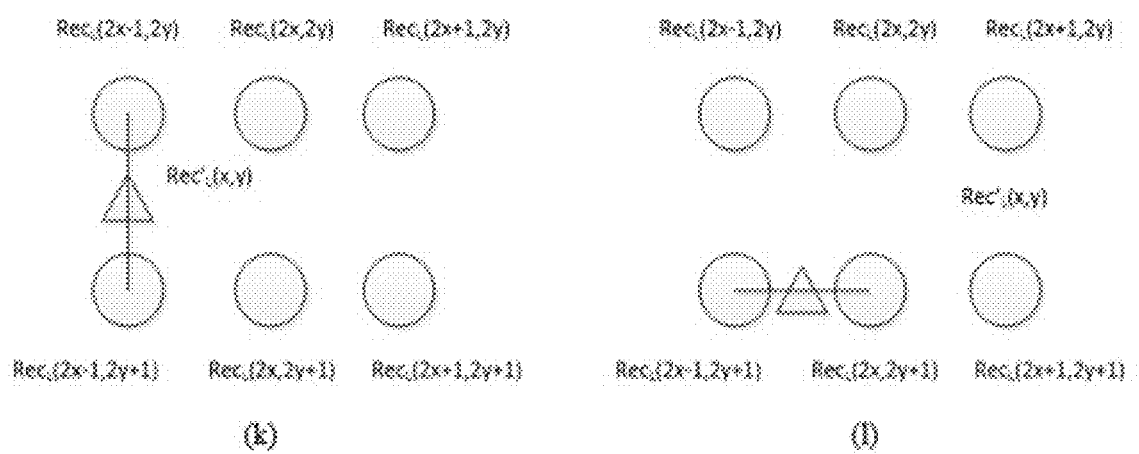
Figure 14C:
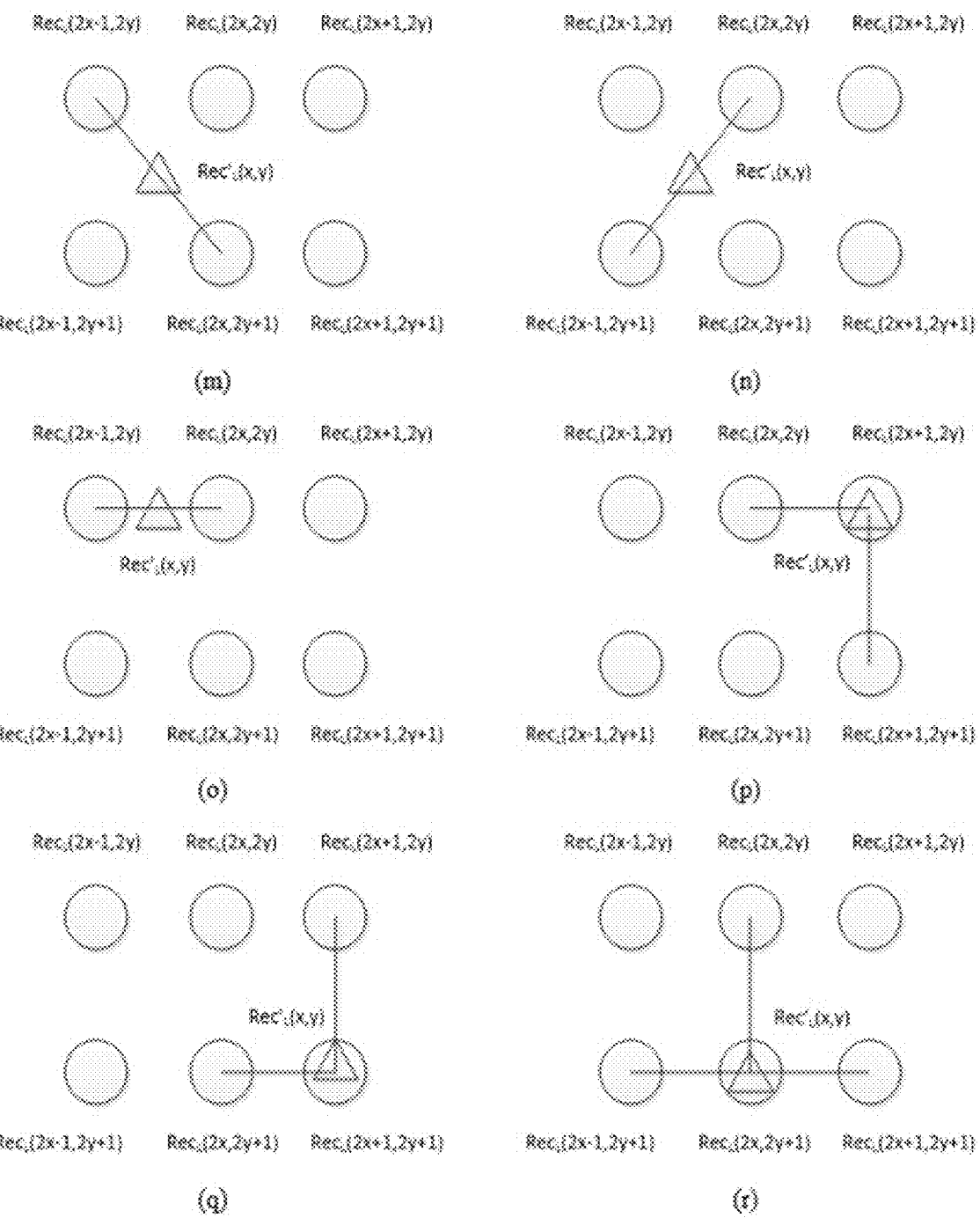

FIGS. 14A-C are conceptual diagrams of luma sub-sampling filters according to an example of the present disclosure. In the examples of FIGS. 14A-14C, the triangle symbols represent a down-sampled luma value, while the circle symbols represent the original reconstructed luma samples (i.e., before any down-sampling). The lines represent which of the original luma samples are used to create a down-sampled luma value according to each specific down-sampling filter. The equations for the various down-sampling filters depicted in FIGS. 14A-14C are shown below:

$$\text{Rec'}_L[x,y]=(\text{Rec}_L[2x,2y]+\text{Rec}_L[2x+1,2y]+1)\gg1; \quad (a)$$

$$\text{Rec'}_L[x,y]=(\text{Rec}_L[2x+1,2y]+\text{Rec}_L[2x+1,2y+1]+1)\gg1; \quad (b)$$

$$\text{Rec'}_L[x,y]=(\text{Rec}_L[2x,2y]+\text{Rec}_L[2x,2y+1]+1)\gg1; \quad (c)$$

$$\text{Rec'}_L[x,y]=(\text{Rec}_L[2x,2y+1]+\text{Rec}_L[2x+1,2y+1]+1)\gg1; \quad (d)$$

$$\text{Rec'}_L[x,y]=(\text{Rec}_L[2x,2y]+\text{Rec}_L[2x+1,2y+1]+1)\gg1; \quad (e)$$

$$\text{Rec'}_L[x,y]=(\text{Rec}_L[2x,2y+1]+\text{Rec}_L[2x+1,2y]+1)\gg1; \quad (f)$$

$$\text{Rec'}_L[x,y]=(\text{Rec}_L[2x,2y]+\text{Rec}_L[2x,2y+1]+\text{Rec}_L[2x-1,2y]+\text{Rec}_L[2x-1,2y+1]+2)\gg2; \quad (g)$$

$$\text{Rec'}_L[x,y]=(\text{Rec}_L[2x,2y]+\text{Rec}_L[2x,2y+1]+\text{Rec}_L[2x+1,2y]+\text{Rec}_L[2x+1,2y+1]+2)\gg2; \quad (h)$$

$$\text{Rec'}_L[x,y]=(2\cdot\text{Rec}_L[2x,2y]+\text{Rec}_L[2x+1,2y]+\text{Rec}_L[2x-1,2y]+2)\gg2; \quad (i)$$

$$\text{Rec'}_L[x,y]=(2\cdot\text{Rec}_L[2x,2y+1]+\text{Rec}_L[2x+1,2y+1]+\text{Rec}_L[2x-1,2y+1]+2)\gg2; \quad (j)$$

$$\text{Rec'}_L[x,y]=(\text{Rec}_L[2x-1,2y]+\text{Rec}_L[2x-1,2y+1]+1)\gg1; \quad (k)$$

$$\text{Rec'}_L[x,y]=(\text{Rec}_L[2x,2y+1]+\text{Rec}_L[2x-1,2y+1]+1)\gg1; \quad (l)$$

$$\text{Rec'}_L[x,y]=(\text{Rec}_L[2x-1,2y]+\text{Rec}_L[2x,2y+1]+1)\gg1; \quad (m)$$

$$\text{Rec'}_L[x,y]=(\text{Rec}_L[2x,2y]+\text{Rec}_L[2x-1,2y+1]+1)\gg1; \quad (n)$$

$$\text{Rec'}_L[x,y]=(\text{Rec}_L[2x,2y]+\text{Rec}_L[2x-1,2y]+1)\gg1; \quad (o)$$

$$\text{Rec'}_L[x,y]=(2\cdot\text{Rec}_L[2x+1,2y]+\text{Rec}_L[2x+1,2y]+\text{Rec}_L[2x+1,2y+1]+2)\gg2; \quad (p)$$

$$\text{Rec'}_L[x,y]=(2\cdot\text{Rec}_L[2x+1,2y+1]+\text{Rec}_L[2x,2y+1]+\text{Rec}_L[2x+1,2y]+2)\gg2; \quad (q)$$

$$\text{Rec'}_L[x,y]=(5\cdot\text{Rec}_L[2x,2y+1]+\text{Rec}_L[2x-1,2y+1]+\text{Rec}_L[2x+1,2y+1]+\text{Rec}_L[2x,2y]+4)\gg3; \quad (r)$$

If the video sequence is not in a 4:4:4 chroma sub-sampling format (i.e., no chroma sub-sampling), video encoder 20 and video decoder 30 may be configured to perform MFLM using the original LM mode (e.g., single model LM mode) and one or more of the filters shown in FIGS. 14A-14C (or any collection of filters in addition to those defined in JEM-3.0 and shown in FIG. 6). In addition, the MFLM techniques of this disclosure may used in conjunction with the MMLM techniques described above.

In some examples, video encoder 20 and video decoder 30 may be preconfigured to use one of several candidate down-sampling filters, such as 5 filters. Video encoder 20 may determine an optimal filter to use for a given video sequence (e.g., based on bitrate distortion testing) and signal a filter index to video decoder 30 in the encoded video bitstream. The filter index may be signaled at the sequence level (e.g., in VPS/SPS), at the picture level (e.g., in PPS), at the slice level (e.g., in Slice header or slice segment header), the coding tree unit level (in CTU), the coding unit level (in CU), the prediction unit level (in PU), the transform unit level (in TU) or any other level of syntax elements.

In one example, the five candidate filters may be as shown below:

$$Rec'_L[x,y]=(2\cdot Rec_L[2x,2y]+2\cdot Rec_L[2x,2y+1]+Rec_L[2x-1,2y]+Rec_L[2x+1,2y]+Rec_L[2x-1,2y+1]+Rec_L[2x+1,2y+1]+4)>>3, \quad \text{Filter0:}$$

$$Rec'_L[x,y]=(Rec_L[2x,2y]+Rec_L[2x,2y+1]+Rec_L[2x+1,2y]+Rec_L[2x+1,2y+1]+2)>>2; \quad \text{Filter1:}$$

$$Rec'_L[x,y]=(Rec_L[2x,2y]+Rec_L[2x+1,2y]+1)>>1; \quad \text{Filter2:}$$

$$Rec'_L[x,y]=(Rec_L[2x+1,2y]+Rec_L[2x+1,2y+1]+1)>>1; \quad \text{Filter3:}$$

$$Rec'_L[x,y]=(Rec_L[2x,2y+1]+Rec_L[2x+1,2y+1]+1)>>1; \quad \text{Filter4:}$$

Filter 1 is the original 6-tap filter in JEM-3.0.

LM modes with different filters may treated as different LM modes, such as LM-MF0, LM-MF1, LM-MF2, LM-MF3 and LM-MF4. In the above example, LM-MF0 is identical to the original LM mode. In another example, video decoder 30 may derive the down-sampling filter without video encoder 20 signaling it. The filtered results may be clipped to the valid luma value range.

Figure 15:
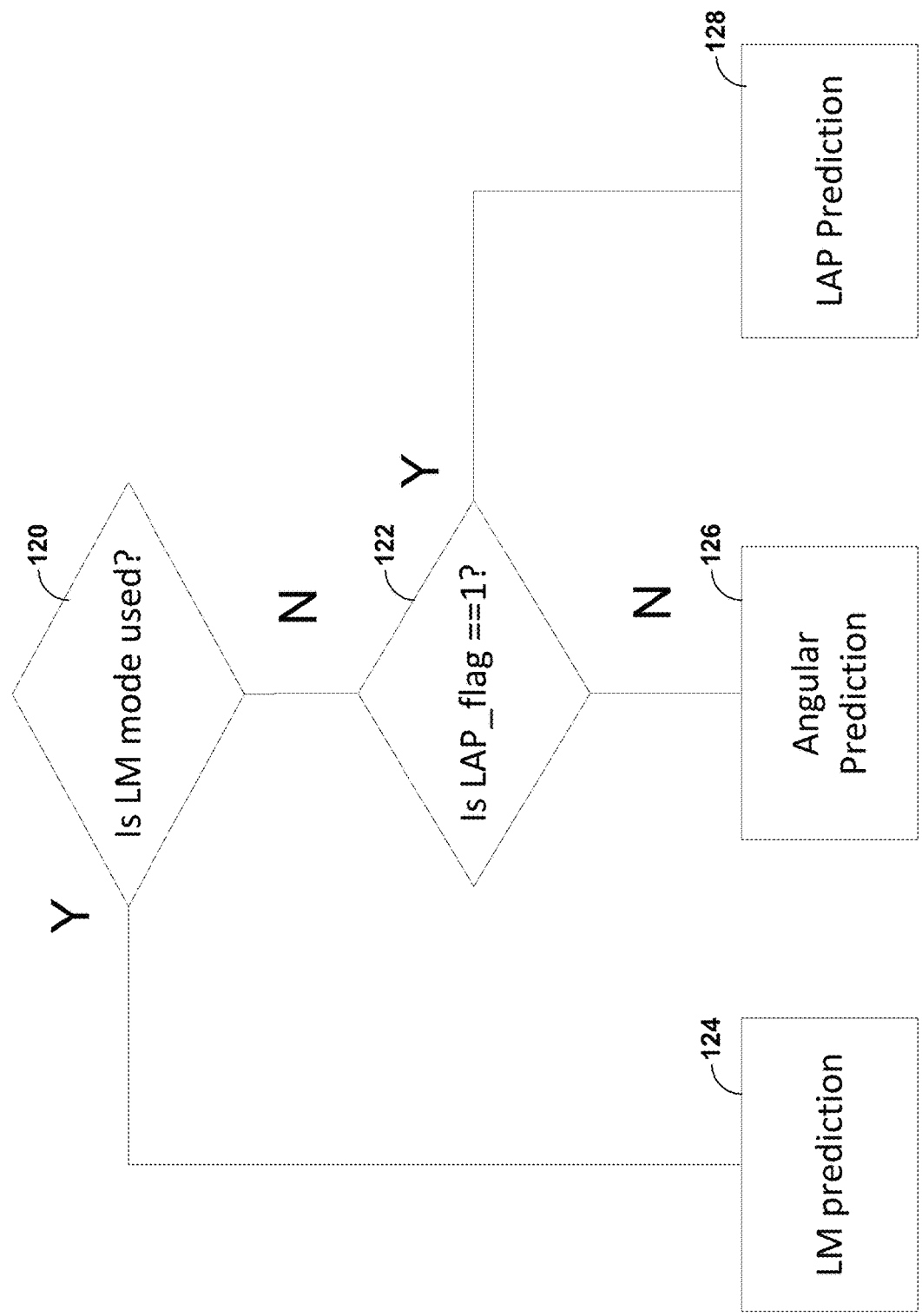
FIG. 15 is a flowchart of signaling in LM-angular prediction (LAP) mode according to an example of this disclosure.

FIG. 15 is a flowchart of signaling in LM-angular prediction (LAP) mode according to an example of this disclosure. With LM-Angular Prediction (LAP), some kinds of angular prediction (may include directional, DC, planar, or other non-cross-component intra prediction) may be combined with LM prediction techniques, including the MMLM techniques of this disclosure, to obtain the final prediction of the chroma block. A syntax element such as a flag, e.g., named LAP_flag, may be signaled if the current Chroma block is coded with conventional intra-prediction but not in any LM mode. Suppose the prediction mode for the current Chroma block is mode X, then X may be some kind of angular intra-prediction (including Planar mode and DC mode). It should be noted that, if the current Chroma block is signaled as the DM mode, the current Chroma block is also treated as an angular mode since it is identical to some kind of angular prediction mode of the corresponding Luma block.

An example of signaling the LAP Prediction mode is illustrated in FIG. 15. Video decoder 30 may determine if an LM mode was used to encode the current chroma block (120). If yes, video decoder 30 proceeds to decode the current chroma block using the LM mode used by video encoder 20 (124). If no, video decoder 30 reads and parses LAP_flag (122). If the LAP_flag indicates that LAP prediction is to be used (e.g., LAP_flag=1), video decoder 30 decodes the current chroma block using LAP prediction mode (128). If the LAP_flag indicates that LAP prediction mode is not to be used (e.g., LAP_flag=0), video decoder 30 decodes the current chroma block using angular prediction (126).

With LAP, two prediction patterns are generated for the chroma block first, and then the two prediction patterns are combined together. One prediction pattern may be generated with the one of several angular prediction modes (e.g., angular mode X). The other prediction may be generated with a kind of LM mode, such as the LM-MM2 mode described above.

Figure 16:
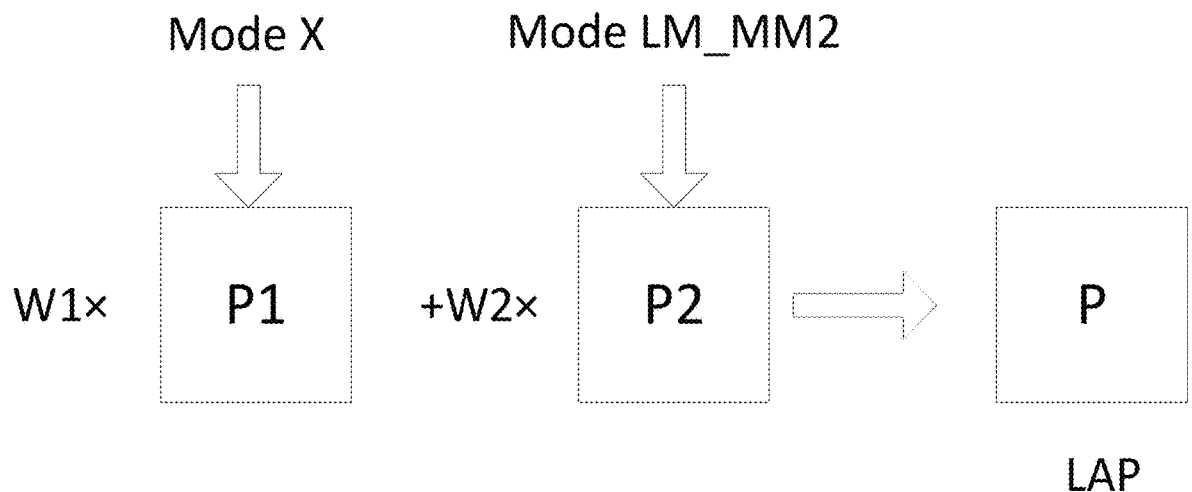
FIG. 16 is a block diagram of LAP according to an example of the present disclosure.

FIG. 16 is a block diagram of LAP according to an example of the present disclosure. As illustrated in FIG. 16, in one example of LAP, first the prediction for each sample in the current block may be generated with the angular prediction mode X, denoted as P1(x,y). Then the prediction of each sample in the current block may be generated with the LM-MM2 mode, denoted as P2(x,y). Then the final LM-Angular prediction may be calculated as $$P(x,y)=w1(x,y)\times P1(x,y)+w2(x,y)\times P2(x,y), \quad (15)$$

where (x,y) represents the coordinate of a sample in a block and w1(x,y) and w2(x,y) are real numbers. In one example, w1 and w2 may have values of 0.5. In eq. (15), w1(x,y) and w2(x,y) may satisfy:

$$w1(x,y)+w2(x,y)=1. \quad (16)$$

In another example, $$P(x,y)=(w1(x,y)\times P1(x,y)+w2(x,y)\times P2(x,y)+a)/b, \quad (17)$$

where w1(x,y),w2(x,y), a and b are integer numbers. In eq. (17), w1(x,y) and w2(x,y) may satisfy:

$$w1(x,y)+w2(x,y)=b. \quad (18)$$

In another example, $$P(x,y)=(w1(x,y)\times P1(x,y)+w2(x,y)\times P2(x,y)+a)>>b, \quad (19)$$

where w1(x,y), w2(x,y), a and b are integer numbers. In eq. (17) w1(x,y) and w2(x,y) may satisfy:

$$w1(x,+w2(x,y)=2^b. \quad (20)$$

In one example, w1(x,y) and w2(x,y) may be different for different (x,y). In another example, w1(x,y) and w2(x,y) may remain unchanged for all (x,y). In one example, $$P(x,y)=(P1(x,y)+P2(x,y)+1)>>1, \quad (21)$$

for all (x,y).

Figure 17:
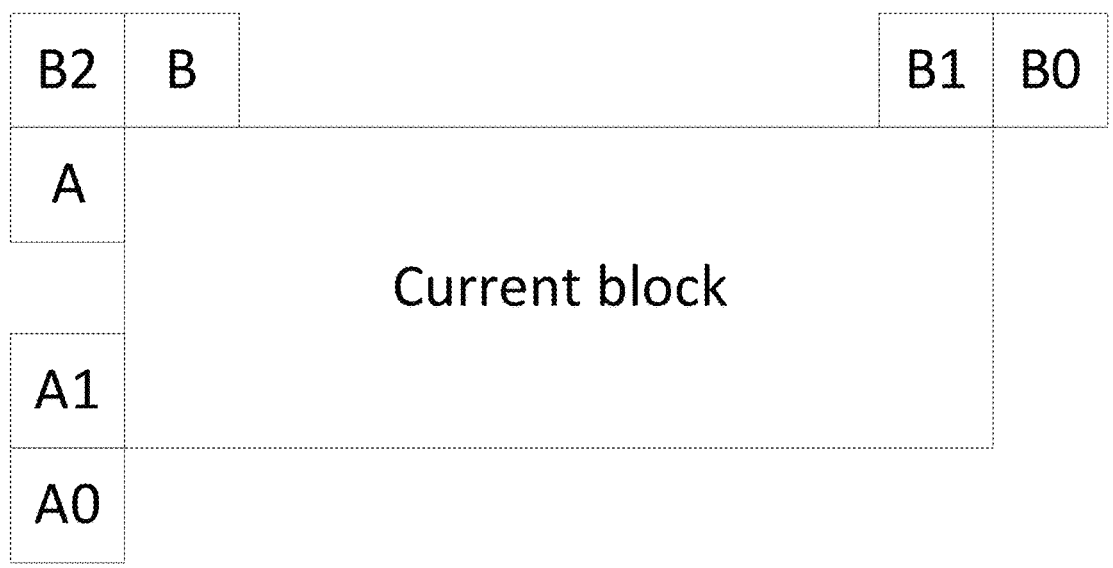
FIG. 17 is a conceptual diagram of neighboring blocks of a current block.

In one example, the LAP_flag may be coded using CABAC. The coding context may depend on the coded/decoded LAP_flag of the neighboring blocks. For example, there may be 3 contexts for LAP_flag: LAPctx[0], LAPctx[1], and LAPctx[2]. FIG. 17 is a conceptual diagram of neighboring blocks of a current block. A variable ctx is calculated as ctx=LAP_flag_A+LAP_flag_B, where LAP_flag_A and LAP_flag_B are the LAP_flags of neighboring blocks A and B or neighboring blocks A1 and B1, as illustrated in FIG. 17, respectively. In one example, P(x,y) may be clipped to the valid chroma value range.

Using the proposed methods of this disclosure, there may be many more types of LM modes used compared to the LM mode specified in JEM-3.0. This disclosure further describes an efficient way to code the chroma intra prediction mode used for a particular block. In general, video encoder 20 and video decoder 30 may be configured to code the LM prediction mode used (including possible MMLM, MFLM, or combined MMLM and MFLM modes) depending on the chroma intra prediction mode of neighboring blocks and/or the other information of the current block. Video encoder 20 and video decoder 30 may be configured to code the LM prediction mode used such that the most likely modes to be used are coded with the smallest codewords used to specify the modes. In this way, fewer bits may be used to indicate the LM modes. Which modes are designated with the smallest codewords may be adaptive based on the chroma intra prediction mode of neighboring blocks and/or the other information of the current block.

In one example, some LM modes, such as LM, LM-MM2 (2 linear models), LM-MM3 (3 linear models), LM-MF1, LM-MF2, LM-MF3 and LM-MF4 are candidate LM modes. Mode LM-MFX may indicate a particular LM mode that uses a particular subset of luma down-sampling filters. An LM-MF mode may use a single linear model LM mode or a MMLM according to the techniques of this disclosure. In this example, there are 7 candidate LM modes, and a Non-LM mode is appended to represent the case if the current block is coded with angular modes, and not LM modes. If Non-LM is signaled, then the angular mode is signaled as in JEM-3.0 or any other methods. The proposed LM modes signaling method is not limited to the specific LM prediction modes as described. The coding methods (including code word mapping and binarization, et al.) could be applied for any other kinds of LM modes, or chroma intra prediction modes signaling. Video encoder 20 and video decoder 30 code the DM_flag first. If the chroma prediction mode is not DM mode, then the proposed LM_coding( ) module is invoked, to indicate the current chroma prediction mode. If the LM_coding( ) module codes the Non-LM mode, then a Chroma_intra_mode_coding( ) module is invoked to code the angular chroma prediction mode. An exemplary coding logic is as follows.

```
{
    DM_flag,
    if( DM_flag == 0 )
    {
        LM_coding( );
        if(IsNotLM(mode))
        {
            Chroma_intra_mode_coding( );
        }
    }
}
```

To signal the 8 possible modes (including a non-LM mode), 8 symbols, 0, 1, . . . , 6, 7 with different codewords, or binarization, may be used to represent the 8 possible modes. A symbol with a smaller number should not have a code length (in bits) longer than that of a symbol with a bigger number. The symbols may be binarized in any way, such as fixed length code, unary code, truncated unary code, exponential Golomb code, etc. Another exemplary binarization for each symbol is as follows:
0: 00
1: 01
2: 100
3: 101
4: 1100
5: 1101
6: 1110
7: 1111

In another example, codewords for each symbol may be as follows:
0: 0
1: 100
2: 101
3: 1100
4: 1101
5: 1110
6: 11110
7: 11111

In one example, video encoder 20 and video decoder 30 may be configured to perform a default mapping between the symbols and the modes, i.e., mapping between coded value and coding mode. For example, a default mapping list may be:
0: LM
1: LM-MM2
2: LM-MM3
3: LM-MF1
4: LM-MF2
5: LM-MF3
6: LM-MF4
7: Non-LM According to one example, the mapping may be fixed. In another example, the mapping may be dynamic according to the decoded information of neighboring blocks and/or the decoded information of current block. In one example, the symbol for the mode Non-LM may be inserted into the mapping list depending on the number of neighboring Chroma blocks coded in LM modes, denoted as K. In one example, the neighboring chroma blocks may be defined to be the five blocks utilized in merge candidate list construction process, i.e., A0, A1, B0, B1, and B2 as shown in FIG. 17. Then the symbol mapping list may be:
  If K==0, Then 0: LM, 1: Non-LM, 2: LM-MM2, 3: LM-MM3, 4: LM-MF1, 5: LM-MF2, 6: LM-MF3, 7: LM-MF4;
  If 0<K<=3, Then 0: LM, 1: LM-MM2, 2: LM-MM3, 3: Non-LM, 4: LM-MF1, 5: LM-MF2, 6: LM-MF3, 7: LM-MF4;
  If K>3, Then 0: LM, 1: LM-MM2, 2: LM-MM3, 3: LM-MF1, 4: LM-MF2, 5: LM-MF3 6: LM-MF4, 7: Non-LM;

In another example, the symbol for the mode Non-LM may be inserted into the mapping list depending on the number of neighboring chroma blocks not coded in LM modes, denoted as K'. Then the symbol mapping list may be:
  If K'==5, Then 0: LM, 1: Non-LM, 2: LM-MM2, 3: LM-MM3, 4: LM-MF1, 5: LM-MF2, 6: LM-MF3, 7: LM-MF4;
  If 2<=K'<5, Then 0: LM, 1: LM-MM2, 2: LM-MM3, 3: Non-LM, 4: LM-MF1, 5: LM-MF2, 6: LM-MF3, 7: LM-MF4;
  If K'<=2, Then 0: LM, 1: LM-MM2, 2: LM-MM3, 3: LM-MF1, 4: LM-MF2, 5: LM-MF3 6: LM-MF4, 7: Non-LM;

In another example, the symbol for the mode Non-LM may be inserted into the mapping list depending on the number of neighboring chroma blocks not coded in intra mode, but not in LM modes, denoted as K'. Then the symbol mapping list may be:
  If K'>=3, Then 0: LM, 1: Non-LM, 2: LM-MM2, 3: LM-MM3, 4: LM-MF1, 5: LM-MF2, 6: LM-MF3, 7: LM-MF4;
  If 2<=K'<3, Then 0: LM, 1: LM-MM2, 2: LM-MM3, 3: Non-LM, 4: LM-MF1, 5: LM-MF2, 6: LM-MF3, 7: LM-MF4;
  If 1<=K'<2, Then 0: LM, 1: LM-MM2, 2: LM-MM3, 3: LM-MF1, 4: LM-MF2, 5: Non-LM, 6: LM-MF3, 7: LM-MF4;

If K'==0, Then 0: LM, 1: LM-MM2, 2: LM-MM3, 3: LM-MF1, 4: LM-MF2, 5: LM-MF3 6: LM-MF4, 7: Non-LM;

In another example, the symbol for the mode non-LM may be inserted into the mapping list depending on the number of neighboring chroma blocks not coded in intra mode, but not in LM modes, denoted as K'. Then the symbol mapping list may be:

If K'>=3, Then 0: LM, 1: Non-LM, 2: LM-MM2, 3: LM-MM3, 4: LM-MF1, 5: LM-MF2, 6: LM-MF3, 7: LM-MF4;

If 1<=K'<3, Then 0: LM, 1: LM-MM2, 2: LM-MM3, 3: Non-LM, 4: LM-MF1, 5: LM-MF2, 6: LM-MF3, 7: LM-MF4;

If K==0, Then 0: LM, 1: LM-MM2, 2: LM-MM3, 3: LM-MF1, 4: LM-MF2, 5: Non-LM, 6: LM-MF3, 7: LM-MF4;

In another example, the symbol for the mode non-LM may be inserted into the mapping list depending on the number of neighboring chroma blocks not coded in intra mode, but not in LM modes, denoted as K'. Then the symbol mapping list may be:

If K'>=3, Then 0: LM, 1: Non-LM, 2: LM-MM2, 3: LM-MM3, 4: LM-MF1, 5: LM-MF2, 6: LM-MF3, 7: LM-MF4;

If 2<=K'<3, Then 0: LM, 1: LM-MM2, 2: LM-MM3, 3: Non-LM, 4: LM-MF1, 5: LM-MF2, 6: LM-MF3, 7: LM-MF4;

If K'<2, Then 0: LM, 1: LM-MM2, 2: LM-MM3, 3: LM-MF1, 4: LM-MF2, 5: LM-MF3 6: LM-MF4, 7: Non-LM;

In another example, the symbol for the mode Non-LM may be inserted into the mapping list depending on the number of neighboring chroma blocks not coded in intra mode, but not in LM modes, denoted as K'. Then the symbol mapping list may be:

If K'>=3, Then 0: LM, 1: Non-LM, 2: LM-MM2, 3: LM-MM3, 4: LM-MF1, 5: LM-MF2, 6: LM-MF3, 7: LM-MF4;

If 1<=K'<3, Then 0: LM, 1: LM-MM2, 2: LM-MM3, 3: Non-LM, 4: LM-MF1, 5: LM-MF2, 6: LM-MF3, 7: LM-MF4;

If K'==0, Then 0: LM, 1: LM-MM2, 2: LM-MM3, 3: LM-MF1, 4: LM-MF2, 5: LM-MF3 6: LM-MF4, 7: Non-LM;

In some examples, the use of the LM of the present disclosure may depend on block size. In one example, if the size of the current chroma block is M×N, LM-X is not applicable if M×N<=T. T may be a fixed number or the value of T may be signaled from the video encoder 20 to video decoder 30. LM-X can be any proposed new LM mode such as LM-MM2, LM-MM3, LM-MF1, LM-MF2, LM-MF3, and LM-MF4.

In another example, if the size of the current chroma block is M×N, LM-X is not applicable if M+N<=T. T may be a fixed number or the value of T may be signaled from the video encoder 20 to video decoder 30. LM-X can be any proposed new LM mode such as LM-MM2, LM-MM3, LM-MF1, LM-MF2, LM-MF3, and LM-MF4.

In still another example, if the size of the current chroma block is M×N, LM-X is not applicable if Min(M, N)<=T. T may be a fixed number or the value of T may be signaled from the video encoder 20 to video decoder 30. LM-X can be any proposed new LM mode such as LM-MM2, LM-MM3, LM-MF1, LM-MF2, LM-MF3, and LM-MF4.

In still another example, if the size of the current chroma block is M×N, LM-X is not applicable if Max(M, N)<=T. T may be a fixed number or the value of T may be signaled from the video encoder 20 to video decoder 30. LM-X can be any proposed new LM mode such as LM-MM2, LM-MM3, LM-MF1, LM-MF2, LM-MF3, and LM-MF4.

The use of the proposed LAP mode may depend on block size. In one example, LAP is not applicable if M×N<=T. T may be a fixed number or the value of T may be signaled from the video encoder 20 to video decoder 30. In another example, LAP is not applicable if M+N<=T. In still another example, LAP is not applicable if Min(M, N)<=T. In still another example, LAP is not applicable if Max(M, N)<=T. T may be any integer, such as 4, 5, 6, 7, 8, 9, 10, 11, 12, 13, 14, 15, 16 . . . , etc., for example.

Figure 18:
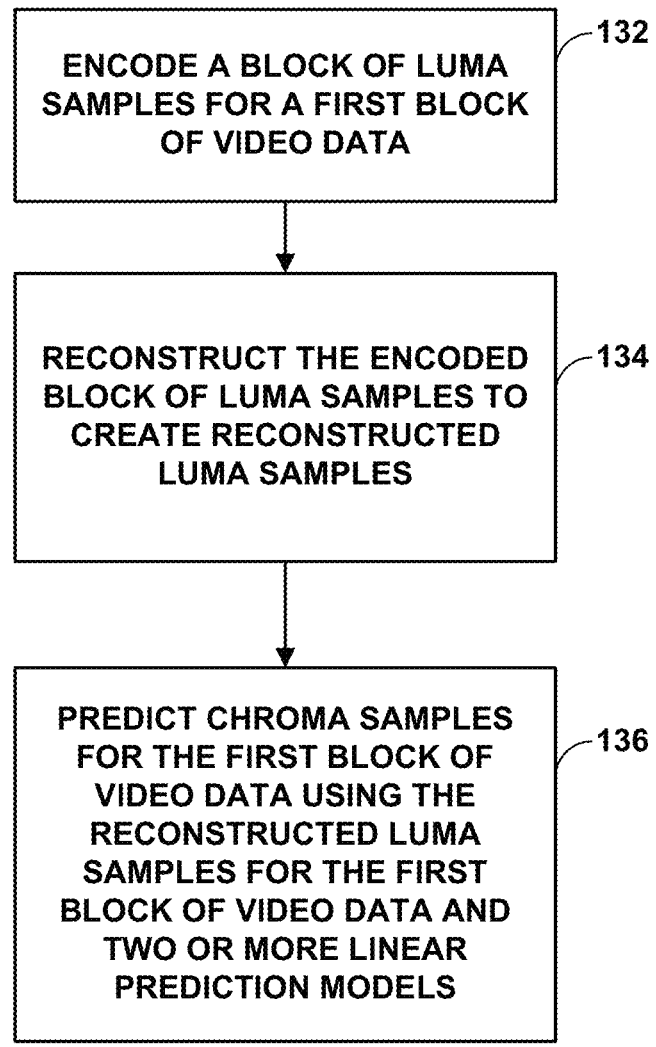
FIG. 18 is a flowchart illustrating an example encoding method of the disclosure.

FIG. 18 is a flowchart illustrating an example encoding method of the disclosure. The techniques of FIG. 18 may be performed by one or more components of video encoder 20.

In one example of the disclosure, video encoder 20 may be configured to encode a block of luma samples for a first block of video data (132), reconstruct the encoded block of luma samples to create reconstructed luma samples (134), and predict chroma samples for the first block of video data using the reconstructed luma samples for the first block of video data and two or more linear prediction models (136).

In another example of the disclosure, video encoder 20 may be configured to determine parameters for each of the two or more linear prediction models using luma samples and chroma samples from blocks of video data that neighbor the first block of video data. In one example, video encoder 20 may be configured to classify the reconstructed luma samples that are greater than a first threshold as being in a first sample group of a plurality of sample groups, classify the reconstructed luma samples that are less than or equal to the first threshold as being in a second sample group of the plurality of sample groups, apply, a first linear prediction model of the two or more linear prediction models to the reconstructed luma samples in the first sample group, apply a second linear prediction model of the two or model linear prediction models to the reconstructed luma samples in the second sample group, the second linear prediction model being different than the first linear prediction model, and determine the predicted chroma samples in the first block of video data based on the applied first linear prediction model and the applied second linear prediction model. In one example, the first threshold is dependent on neighboring coded luma and chroma samples.

In another example of the disclosure, video encoder 20 may be configured to down-sample the reconstructed luma samples. In another example of the disclosure, video encoder 20 may be configured to determine one of a plurality of down-sampling filters to use to down-sample the reconstructed luma samples, down-sample the reconstructed luma samples using the determined down-sampling filter to produce down-sampled luma samples, and predict chroma samples for the first block of video data using the down-sampled luma samples and the two or more linear prediction models.

In another example of the disclosure, video encoder 20 may be configured to determine whether chroma samples of a second block of video data are coded using a linear prediction model of the two or more linear prediction models. In the case that the chroma samples of the second block of video data are not coded using the linear prediction model, video encoder 20 may be configured to determine that a linear mode angular prediction mode is enabled, apply an angular mode prediction pattern to the chroma samples of the second block of video data to produce first predicted chroma values, apply a linear model prediction pattern to corresponding luma samples of the second block of video data to produce second predicted chroma values, and determine a final block of predicted chroma values for the second block of video data by determining a weighted average of the first predicted chroma value sand the second predicted chroma values.

In another example of the disclosure, video encoder 20 may be configured to determine a number of neighboring chroma blocks, relative to the first block of video data, that are coded using a linear prediction model coding mode, and dynamically change a code word used to indicate a particular type of the linear prediction model coding mode based on the determined number of neighboring chroma blocks of the video data coded using the linear prediction model coding mode. In one example, video encoder 20 may be configured to use a first symbol mapping list based on the number of neighboring chroma blocks of the video data coded using the linear prediction model coding mode being zero, use a second symbol mapping list based on the number of neighboring chroma blocks of the video data coded using the linear prediction model coding mode being less than a threshold, use a third symbol mapping list based on the number of neighboring chroma blocks of the video data coded using the linear prediction model coding mode being greater than the threshold.

Figure 19:
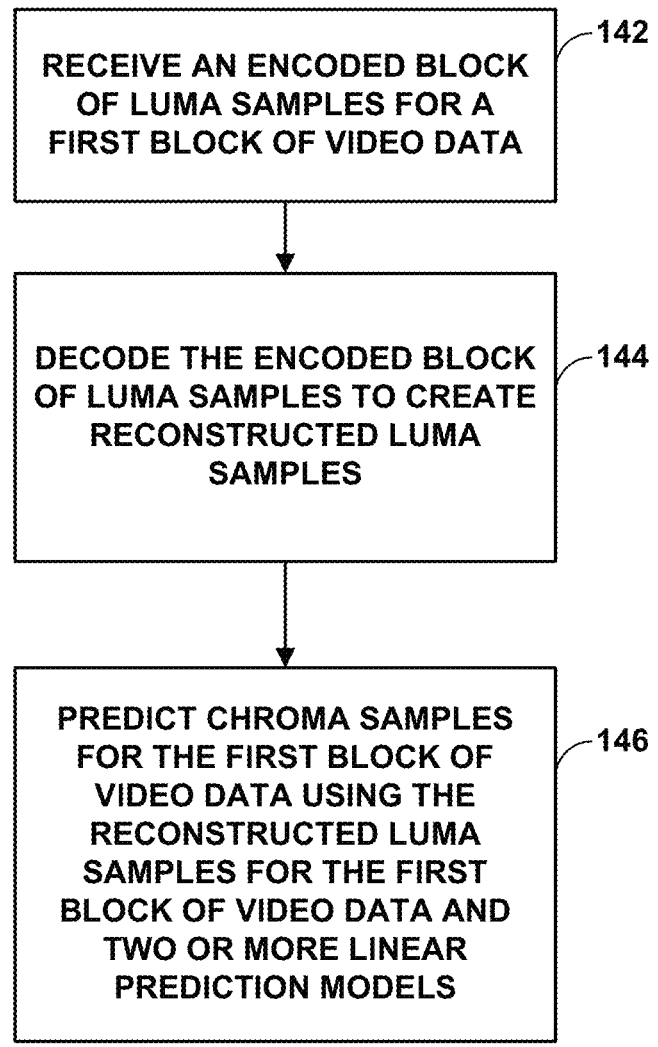
FIG. 19 is a flowchart illustrating an example encoding method of the disclosure.

FIG. 19 is a flowchart illustrating an example encoding method of the disclosure. The techniques of FIG. 19 may be performed by one or more components of video decoder 30.

In one example of the disclosure, video decoder 30 may be configured to receive an encoded block of luma samples for a first block of video data (142), decode the encoded block of luma samples to create reconstructed luma samples (144), and predict chroma samples for the first block of video data using the reconstructed luma samples for the first block of video data and two or more linear prediction models (146).

In another example of the disclosure, video decoder 30 may be configured to determine parameters for each of the two or more linear prediction models using luma samples and chroma samples from blocks of video data that neighbor the first block of video data. In one example, video decoder 30 may be configured to classify the reconstructed luma samples that are greater than a first threshold as being in a first sample group of a plurality of sample groups, classify the reconstructed luma samples that are less than or equal to the first threshold as being in a second sample group of the plurality of sample groups, apply, a first linear prediction model of the two or more linear prediction models to the reconstructed luma samples in the first sample group, apply a second linear prediction model of the two or model linear prediction models to the reconstructed luma samples in the second sample group, the second linear prediction model being different than the first linear prediction model, and determine the predicted chroma samples in the first block of video data based on the applied first linear prediction model and the applied second linear prediction model. In one example, the first threshold is dependent on neighboring coded luma and chroma samples.

In another example of the disclosure, video decoder 30 may be configured to down-sample the reconstructed luma samples. In another example of the disclosure, video decoder 30 may be configured to determine one of a plurality of down-sampling filters to use to down-sample the reconstructed luma samples, down-sample the reconstructed luma samples using the determined down-sampling filter to produce down-sampled luma samples, and predict chroma samples for the first block of video data using the down-sampled luma samples and the two or more linear prediction models.

In another example of the disclosure, video decoder 30 may be configured to determine whether chroma samples of a second block of video data are coded using a linear prediction model of the two or more linear prediction models. In the case that the chroma samples of the second block of video data are not coded using the linear prediction model, video decoder 30 may be configured to determine that a linear mode angular prediction mode is enabled, apply an angular mode prediction pattern to the chroma samples of the second block of video data to produce first predicted chroma values, apply a linear model prediction pattern to corresponding luma samples of the second block of video data to produce second predicted chroma values, and determine a final block of predicted chroma values for the second block of video data by determining a weighted average of the first predicted chroma value sand the second predicted chroma values.

In another example of the disclosure, video decoder 30 may be configured to determine a number of neighboring chroma blocks, relative to the first block of video data, that are coded using a linear prediction model coding mode, and dynamically change a code word used to indicate a particular type of the linear prediction model coding mode based on the determined number of neighboring chroma blocks of the video data coded using the linear prediction model coding mode. In one example, video encoder 20 may be configured to use a first symbol mapping list based on the number of neighboring chroma blocks of the video data coded using the linear prediction model coding mode being zero, use a second symbol mapping list based on the number of neighboring chroma blocks of the video data coded using the linear prediction model coding mode being less than a threshold, use a third symbol mapping list based on the number of neighboring chroma blocks of the video data coded using the linear prediction model coding mode being greater than the threshold.

Figure 20:
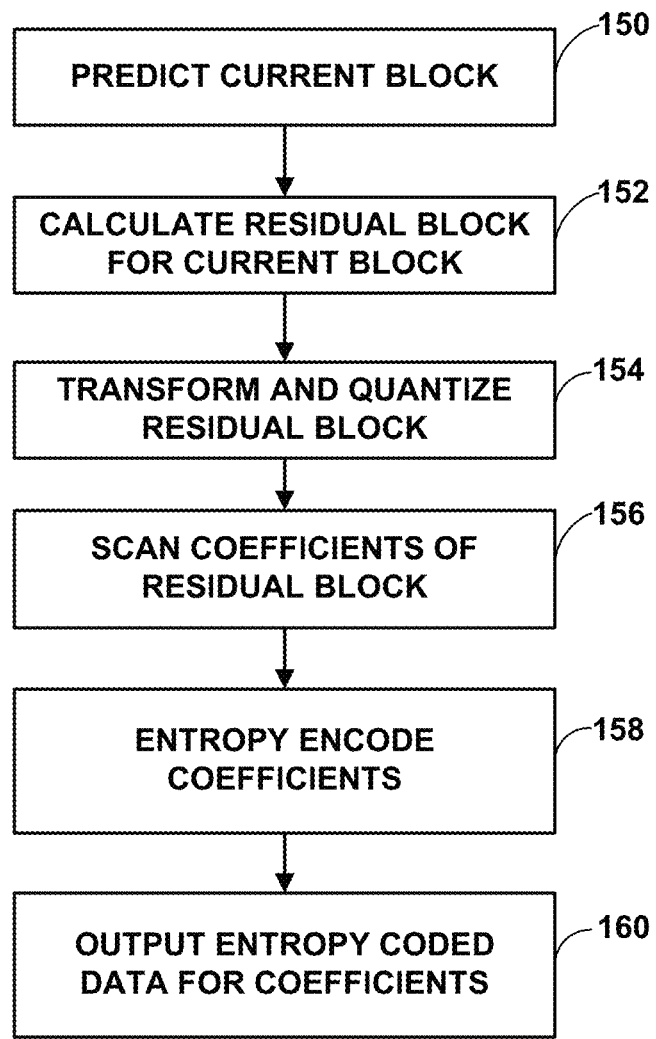
FIG. 20 is a flowchart illustrating an example method for encoding a current block.

FIG. 20 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 20.

In this example, video encoder 20 initially predicts the current block (150). For example, video encoder 20 may calculate one or more prediction units (PUs) for the current block. Video encoder 20 may then calculate a residual block for the current block, e.g., to produce a transform unit (TU) (152). To calculate the residual block, video encoder 20 may calculate a difference between the original, uncoded block and the predicted block for the current block. Video encoder 20 may then transform and quantize coefficients of the residual block (154). Next, video encoder 20 may scan the quantized transform coefficients of the residual block (156). During the scan, or following the scan, video encoder 20 may entropy encode the coefficients (158). For example, video encoder 20 may encode the coefficients using CAVLC or CABAC. Video encoder 20 may then output the entropy coded data for the coefficients of the block (160).

Figure 21:
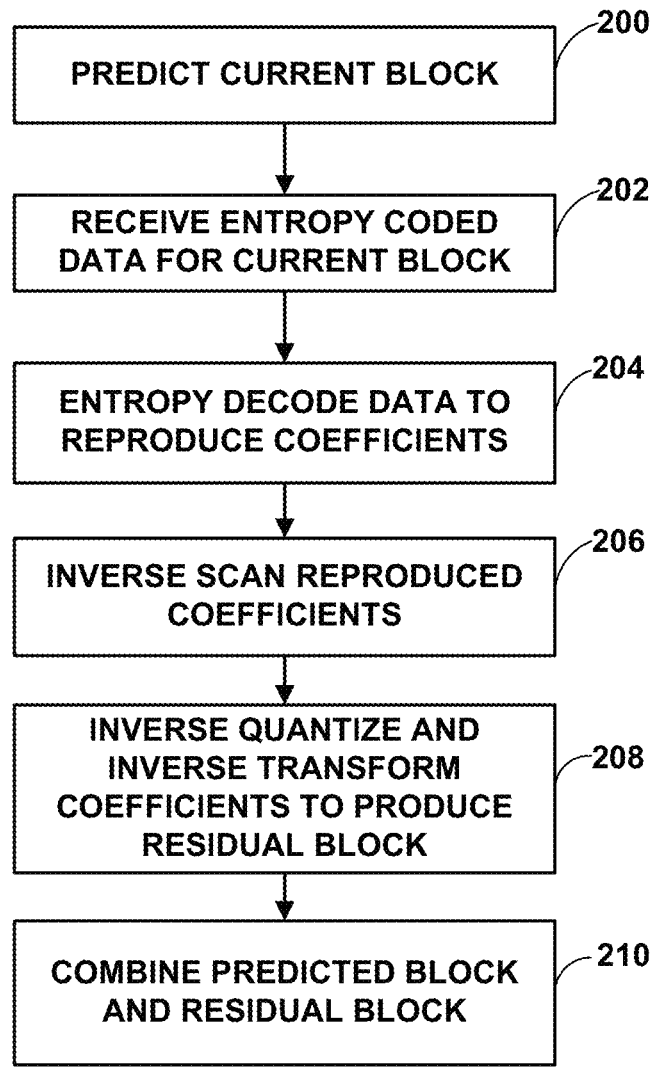
FIG. 21 is a flowchart illustrating an example method for decoding a current block of video data.

FIG. 21 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 21.

Video decoder 30 may predict the current block (200), e.g., using an intra- or inter-prediction mode to calculate a predicted block for the current block. Video decoder 30 may also receive entropy coded data for the current block, such as entropy coded data for coefficients of a residual block corresponding to the current block (202). Video decoder 30 may entropy decode the entropy coded data to reproduce coefficients of the residual block (204). Video decoder 30 may then inverse scan the reproduced coefficients (206) to create a block of quantized transform coefficients. Video decoder 30 may then inverse quantize and inverse transform the coefficients to produce a residual block (208). Video decoder 30 may ultimately decode the current block by combining the predicted block and the residual block (210).

The following summarizes examples of the disclosure discussed above. The above described examples of LM prediction using a Multi-Model method, a Multi-filter method, and the LM-Angular prediction may be applied individually or in any combination. There may be more than one linear models between the luma and chroma components in a coding block/coding unit (CU)/transform unit (TU). Neighboring luma samples and chroma samples of the current block may be classified into several groups, and each group may be used as a training set to derive a linear model (i.e., particular $\alpha$ and $\beta$ are derived for a particular group). In one example, the classification of samples may be based on the intensities or positions of the samples. In another example, the classification method may be signaled from the encoder to the decoder.

In one example, as shown in FIG. 7A, the neighboring samples may be classified into two groups. A neighboring sample with $Rec'_L[x,y] \leq Threshold$ may be classified into group 1; while a neighboring sample with $Rec'_L[x,y] > Threshold$ may be classified into group 2. In one example, Threshold can be calculated depending on the neighboring coded Luma/Chroma samples and the coded Luma samples in the current block. In one example, Threshold may be calculated as the average value of the neighboring coded Luma samples (which may be down-sampled if not in 4:4:4 format). In another example, Threshold may be calculated as the median value of the neighboring coded Luma samples (which may be down-sampled if not in 4:4:4 format). In still another example, Threshold may be calculated as the average of minV and maxV, wherein minV and maxV are the minimum value and the maximum values respectively of the neighboring coded Luma samples (which may be down-sampled if not in 4:4:4 format). In another example, Threshold may be calculated as the average value of the neighboring coded Luma samples and the coded Luma samples in the current block (which may be down-sampled if not in 4:4:4 format). In another example, Threshold may be calculated as the median value of the neighboring coded Luma samples and the coded Luma samples in the current block (which may be down-sampled if not in 4:4:4 format). In another example, Threshold may be calculated as the average of minV and maxV, wherein minV and maxV are the minimum value and the maximum values respectively of the neighboring coded Luma samples and the coded Luma samples in the current block (which may be down-sampled if not in 4:4:4 format). In one example, Threshold may be signaled from the encoder 20 to the decoder 30.

In one example, as illustrated in FIG. 7B, the neighboring samples may be classified into three groups. A neighboring sample with $Rec'_L[x,y] \leq Threshold1$ may be classified into group 1; a neighboring sample with $Threshold1 < Rec'_L[x,y] \leq Threshold2$ may be classified into group 2 and a neighboring sample with $Rec'_L[x,y] > Threshold2$ may be classified into group 3. In one example, Threshold1 and Threshold2 may be calculated depending on the neighboring coded Luma/Chroma samples and the coded Luma samples in the current block. In one example, Threshold may be calculated firstly as described above. Then, Threshold1 may be calculated as the average of minV and Threshold. Threshold2 may be calculated as the average of maxV and Threshold. minV and maxV may be the minimum value and the maximum values, respectively, of the neighboring coded Luma samples (which may be down-sampled if not in 4:4:4 format). In another example, Threshold1 may be calculated as ⅓ of sumV. Threshold2 may be calculated as ⅔ of sumV. sumV may be the accumulated sum value of the neighboring coded Luma samples (which may be down-sampled if not in 4:4:4 format). In another example, Threshold1 may be calculated as a value between $S[N/3]$ and $S[N/3+1]$. Threshold2 may be calculated as $S[2*N/3]$ and $S[2*N/3+1]$. N may be the total number of the neighboring coded Luma samples (which may be down-sampled if not in 4:4:4 format). $S[0]$, $S[1]$, . . . $S[N-2]$, $S[N-1]$ may be the ascending sorted sequence of neighboring coded Luma samples (which may be down-sampled if not in 4:4:4 format). In another example, Threshold may be calculated firstly as described above. Then Threshold1 may be calculated as the average of minV and Threshold. Threshold2 may be calculated as the average of maxV and Threshold. minV and maxV may be the minimum value and the maximum values, respectively, of the neighboring coded Luma samples (which may be down-sampled if not in 4:4:4 format) and the coded Luma samples in the current block (which may be down-sampled if not in 4:4:4 format). In another example, Threshold1 may be calculated as ⅓ of sumV. Threshold2 may be calculated as ⅔ of sumV. sumV may be the accumulated sum value of the neighboring coded Luma samples (which may be down-sampled if not in 4:4:4 format) and the coded Luma samples in the current block (which may be down-sampled if not in 4:4:4 format). In another example, Threshold) may be calculated as a value between $S[N/3]$ and $S[N/3+1]$. Threshold2 may be calculated as $S[2*N/3]$ and $S[2*N/3+1]$. N may be the total number of the neighboring coded Luma samples (which may be down-sampled if not in 4:4:4 format) and the coded Luma samples in the current block (which may be down-sampled if not in 4:4:4 format). $S[0]$, $S[1]$, . . . $S[N-2]$, $S[N-1]$ may be the ascending sorted sequence of neighboring coded Luma samples (which may be down-sampled if not in 4:4:4 format) and the coded Luma samples in the current block (which may be down-sampled if not in 4:4:4 format). In one example, Threshold) and Threshold2 may be signaled from the encoder 20 to the decoder 30. In one example, more neighboring samples may be used to derive the linear-models above, e.g., as in the examples shown in FIGS. 8A-8D.

In one example, Model 1 or Model 2 derived in MMLM may be applied to all pixels in the current block, as illustrated in FIGS. 11 and 12, respectively. In another example, pixels in the current block may be classified first, then some of them choose to apply Model 1 while others choose to apply Model 2, as illustrated in FIG. 13. In one example, it may be required that the classification method should be identical for the coded neighboring Luma samples and for the coded Luma samples in the current block.

In one example, as illustrated in FIG. 13, coded Luma samples (down-sampled if not in the 4:4:4 format) in the current block in the group 1 may apply Model 1 to derive the corresponding predicted Chroma samples in the current block, while coded Luma samples (down-sampled if not in the 4:4:4 format) in the current block in the group 2 may apply Model 2 to derive the corresponding predicted Chroma samples in the current block. In this way, the predicted Chroma samples in the current block may be derived according to two linear-models. When there are more groups, more linear-models may be used to obtain the predicted Chroma samples.

In one example, the number of samples in a group after the classification may be required to be larger than a specific number, such as 2 or 3. In one example, if the number of samples in a group is smaller than the specific number, samples in other groups may be changed to this group. For example, a sample in the group with the most samples may be changed to the group with samples less than the specific number. In one example, a sample in the group (named group A) with the most samples may be changed to the group (named group B) with samples less than the specific number if it is the nearest sample to the existing sample in group B. "Nearest" may refer to the nearest in pixel position. Or "nearest" may refer to the nearest intensity. In one example, the encoder 20 may signal the number of groups the samples should be classified in to the decoder 30. If the number is 1, it is the original LM mode. In another example, LM mode with different number of groups may be treated as different LM modes, for example, LM-MM1 with 1 group, LM-MM2 with 2 groups and LM-MM3 with 3 groups. LM-MM1 is identical to the original LM mode. In another example, the decoder 30 may derive the number of groups without encoder 20 signaling the number of groups.

In one example, there may be more than one Luma down-sampling filter when not in the 4:4:4 format, other than the down-sampling filter defined in JEM-3.0, as illustrated in FIG. 6. In one example, the filters may be in a form of:

$Rec'_L[x,y] = a \cdot Rec_L[2x,2y] + b \cdot Rec_L[2x,2y+1] + c \cdot Rec_L[2x-1,2y] + d \cdot Rec_L[2x+1,2y] + e \cdot Rec_L[2x-1,2y+1] + f \cdot Rec_L[2x+1,2y+1] + g$,      a.

where a, b, c, d, e, f, g are real numbers.

$Rec'_L[x,y] = (a \cdot Rec_L[2x,2y] + b \cdot Rec_L[2x,2y+1] + c \cdot Rec_L[2x-1,2y] + d \cdot Rec_L[2x+1,2y] + e \cdot Rec_L[2x-1,2y+1] + f \cdot Rec_L[2x+1,2y+1] + g)/h$,      b.

where a, b, c, d, e, f, g, h are integer numbers.

$Rec'_L[x,y] = (a \cdot Rec_L[2x,2y] + b \cdot Rec_L[2x,2y+1] + c \cdot Rec_L[2x-1,2y] + d \cdot Rec_L[2x+1,2y] + e \cdot Rec_L[2x-1,2y+1] + f \cdot Rec_L[2x+1,2y+1] + g) >> h$,      c.

where a, b, c, d, e, f, g, h are integer numbers.

Examples of possible filters are illustrated in FIGS. 14A-14C, such as the following possible filters, for example:

$Rec'_L[x,y] = (Rec_L[2x,2y] + Rec_L[2x+1,2y] + 1) >> 1$;      a.

$Rec'_L[x,y] = (Rec_L[2x+1,2y] + Rec_L[2x+1,2y+1] + 1) >> 1$;      b.

$Rec'_L[x,y] = (Rec_L[2x,2y] + Rec_L[2x,2y+1] + 1) >> 1$;      c.

$Rec'_L[x,y] = (Rec_L[2x,2y+1] + Rec_L[2x+1,2y+1] + 1) >> 1$;      d.

$Rec'_L[x,y] = (Rec_L[2x,2y] + Rec_L[2x+1,2y+1] + 1) >> 1$;      e.

$Rec_L[x,y] = (Rec_L[2x,2y+1] + Rec_L[2x+1,2y] + 1) >> 1$;      f.

$Rec'_L[x,y] = (Rec_L[2x,2y] + Rec_L[2x,2y+1] + Rec_L[2x-1,2y] + Rec_L[2x-1,2y+1] + 2) >> 2$;      g.

$Rec'_L[x,y] = (Rec_L[2x,2y] + Rec_L[2x,2y+1] + Rec_L[2x+1,2y] + Rec_L[2x+1,2y+1] + 2) >> 2$;      h.

$Rec'_L[x,y] = (2 \cdot Rec_L[2x,2y] + Rec_L[2x+1,2y] + Rec_L[2x-1,2y] + 2) >> 2$;      i.

$Rec'_L[x,y] = (2 \cdot Rec_L[2x,2y+1] + Rec_L[2x+1,2y+1] + Rec_L[2x-1,2y+1] + 2) >> 2$;      j.

$Rec'_L[x,y] = (Rec_L[2x-1,2y] + Rec_L[2x-1,2y+1] + 1) >> 1$;      k.

$Rec'_L[x,y] = (Rec_L[2x,2y+1] + Rec_L[2x-1,2y+1] + 1) >> 1$;      l.

$Rec'_L[x,y] = (Rec_L[2x-1,2y] + Rec_L[2x,2y+1] + 1) >> 1$;      m.

$Rec'_L[x,y] = (Rec_L[2x,2y] + Rec_L[2x-1,2y+1] + 1) >> 1$;      n.

$Rec'_L[x,y] = (Rec_L[2x,2y] + Rec_L[2x-1,2y] + 1) >> 1$;      o.

$Rec'_L[x,y] = (2 \cdot Rec_L[2x+1,2y] + Rec_L[2x+1,2y] + Rec_L[2x+1,2y+1] + 2) >> 2$;      p.

$Rec'_L[x,y] = (2 \cdot Rec_L[2x+1,2y+1] + Rec_L[2x,2y+1] + Rec_L[2x+1,2y] + 2) >> 2$;      q.

$Rec'_L[x,y] = (5 \cdot Rec_L[2x,2y+1] + Rec_L[2x-1,2y+1] + Rec_L[2x+1,2y+1] + Rec_L[2x,2y] + 4) >> 3$;      r.

In one example, if the sequence is not in 4:4:4 format, LM mode may operate with any down-sampling filter besides the filter defined in JEM-3.0, and shown in FIG. 6 of this disclosure. In one example, the decoder 30 can derive the down-sampling filter without the encoder 20 signaling it. In an example, the filtered results may be clipped to the valid Chroma value range. Types of angular prediction and types of LM prediction may be combined together to obtain the final prediction. A flag, named LAP_flag, may be signaled if the current Chroma block is coded with intra-prediction but not in any LM mode. In one example, if the prediction mode for the current Chroma block is mode X, then X may be a type of angular intra-prediction (including Planar mode and DC mode). It should be noted that, if the current Chroma block is signaled as the DM mode, it is also treated as an angular mode since it is identical to a type of angular prediction mode of the corresponding Luma block. In one example, two prediction patterns may be generated for the Chroma block first, and then combined together. One prediction pattern may be generated with the angular mode X. The other prediction may be generated with a type of LM mode, such as the LM-MM2 mode, for example.

As illustrated in FIG. 16, first, the prediction for each sample in the current block may be generated with the angular prediction mode X, denoted as P1(x,y). Then the prediction of each sample in the current block may be generated with the LM-MM2 mode, denoted as P2(x,y). Then the final LM-Angular prediction may be calculated as $P(x,y) = w1(x,y) \times P1(x,y) + w2(x,y) \times P2(x,y)$, where (x,y) represents the coordinate of a sample in a block and w1(x,y) and w2(x,y) are real numbers. w1(x,y) and w2(x,y) may satisfy w1(x,y)+w2(x,y)=1. In another example, the final LM-Angular prediction may be calculated as:

$$P(x,y) = (w1(x,y) \times P1(x,y) + w2(x,y) \times P2(x,y) + a)/b,$$

where w1(x,y), w2(x,y), a and b are integer numbers and w1(x,y) and w2(x,y) may satisfy w1(x,y)+w2(x,y)=b.

In another example, the final LM-Angular prediction may be calculated as $$P(x,y) = (w1(x,y) \times P1(x,y) + w2(x,y) \times P2(x,y) + a) >> b,$$

where w1(x,y), w2(x,y), a and b are integer numbers and w1(x,y) and w2(x,y) may satisfy: $w1(x,y)+w2(x,y)=2^b$. In one example, w1(x,y) and w2(x,y) may be different for different (x,y). In another example, w1(x,y) and w2(x,y) may be unchanged for all (x,y). In one example, $P(x,y)=(P1(x,y)+P2(x,y)+1)>>1$, for all (x,y).

In one example, a LAP_flag may be coded by CABAC. The coding context may depend on the coded/decoded LAP_flag of the neighboring blocks. For example, there may be 3 contexts for LAP_flag: LAPctx[0], LAPctx[1], and LAPctx[2]. A variable ctx may be calculated as ctx=LAP_flag_A+LAP_flag_B, where LAP_flag_A and LAP_flag_B are the LAP_flags of neighboring blocks A and B, respectively, as illustrated in FIG. 17. In one example, P(x,y) may be clipped to the valid Chroma value range. In one example, coding of LM modes may depend on the Chroma intra prediction mode of neighboring blocks. In one example, some LM modes, such as LM, LM-MM2, LM-MM3, LM-MF2, LM-MF3 and LM-MF4 may be candidate LM modes. In this example, there are 7 candidate LM modes, and a Non-LM mode is appended to represent the case where the current block is coded with angular modes, not LM modes. If Non-LM is signaled, then the angular mode may be signaled as in JEM-3.0, or any other non-LM methods.

In an example coding logic, the DM_flag may be coded first. If the Chroma prediction mode is not DM mode, then the proposed LM_coding( ) module may be invoked, to indicate the current Chroma prediction mode. If LM_coding( ) module codes the Non-LM mode, then Chroma_intra_mode_coding( ) module may be invoked to code the angular Chroma prediction mode.

```
{
    DM_flag,
    if( DM_flag == 0 )
    {
        LM_coding( );
        if(IsNotLM(mode))
        {
            Chroma_intra_mode_coding( );
        }
    }
}
```

In one example, in order to signal the possible N modes (including Non-LM), N symbols, 0, 1, . . . , 6, 7 with different codewords, or called binarization, may be used to represent the N possible modes. A symbol with a smaller number may not have a code length longer than that of a symbol with a bigger number. The symbols may be binarized in any way, such as fixed length code, unary code, truncated unary code, exponential Golomb code, etc. In one example, there may be a default mapping between the symbols and the modes. In one example, mapping may be fixed, or may be dynamic according to the decoded neighboring blocks.

In one example, the symbol for the mode Non-LM may be inserted into the mapping list depending on the number of neighboring Chroma blocks coded in LM modes, denoted as K. In one example, the symbol mapping list may be:
If K==0, Then 0: LM, 1: Non-LM, 2: LM-MM2, 3: LM-MM3, 4: LM-MF1, 5: LM-MF2, 6: LM-MF3, 7: LM-MF4;
If 0<K<=3, Then 0: LM, 1: LM-MM2, 2: LM-MM3, 3: Non-LM, 4: LM-MF1, 5: LM-MF2, 6: LM-MF3, 7: LM-MF4;
If K>3, Then 0: LM, 1: LM-MM2, 2: LM-MM3, 3: LM-MF1, 4: LM-MF2, 5: LM-MF3, 6: LM-MF4, 7: Non-LM;
In one example, the symbol for the mode Non-LM may be inserted into the mapping list depending on the number of neighboring Chroma blocks not coded in LM modes, denoted as K' and the symbol mapping list may be:
If K'==5, Then 0: LM, 1: Non-LM, 2: LM-MM2, 3: LM-MM3, 4: LM-MF1, 5: LM-MF2, 6: LM-MF3, 7: LM-MF4;
If 2<=K'<5, Then 0: LM, 1: LM-MM2, 2: LM-MM3, 3: Non-LM, 4: LM-MF1, 5: LM-MF2, 6: LM-MF37: LM-MF4;
If K'<=2, Then 0: LM, 1: LM-MM2, 2: LM-MM3, 3: LM-MF1, 4: LM-MF2, 5: LM-MF3, 6: LM-MF4, 7: Non-LM;
In one example, the symbol for the mode Non-LM may be inserted into the mapping list depending on the number of neighboring Chroma blocks not coded in LM modes, denoted as K' and the symbol mapping list may be:
If K'==5, Then 0: LM, 1: Non-LM, 2: LM-MM2, 3: LM-MM3, 4: LM-MF1, 5: LM-MF2, 6: LM-MF3, 7: LM-MF4;
If 2<=K'<5, Then 0: LM, 1: LM-MM2, 2: LM-MM3, 3: Non-LM, 4: LM-MF1, 5: LM-MF2, 6: LM-MF37: LM-MF4;
If K'<=2, Then 0: LM, 1: LM-MM2, 2: LM-MM3, 3: LM-MF1, 4: LM-MF2, 5: LM-MF3, 6: LM-MF4, 7: Non-LM;

In one example, the use of the proposed LM improvements may depend on block size. In one example, if the size of the current chroma block is M×N, LM-X may not be applicable if M×N<=T, where T may be a fixed number or may be signaled from the encoder 20 to the decoder 30. LM-X may be any LM mode, such as LM-MM2, LM-MM3, LM-MF1, LM-MF2, LM-MF3, and LM-MF4, for example. In one example, LM-X may not be applicable if M+N<=T, where T may be a fixed number or may be signaled from the encoder 20 to the decoder 30. LM-X may be any LM mode, such as LM-MM2, LM-MM3, LM-MF1, LM-MF2, LM-MF3, and LM-MF4, for example. In one example, LM-X may not be applicable if Min (M, N)<=T, where T may be a fixed number or may be signaled from the encoder 20 to the decoder 30. LM-X may be any LM mode, such as LM-MM2, LM-MM3, LM-MF1, LM-MF2, LM-MF3, and LM-MF4, for example. In another example, LM-X may not be applicable if Max (M, N)<=T. T may be a fixed number or may be signaled from the encoder 20 to the decoder 30. LM-X may be any LM mode, such as LM-MM2, LM-MM3, LM-MF1, LM-MF2, LM-MF3, and LM-MF4. In one example, LAP may not be applicable if M×N<=T, where T may be a fixed number or may be signaled from the encoder 20 to the decoder 30. In one example, LAP may not be applicable if M+N<=T, where T may be a fixed number or may be signaled from the encoder 20 to the decoder 30. In another example, LAP may not be applicable if Min(M, N)<=T, where T may be a fixed number or may be signaled from the encoder 20 to the decoder 30. In one example, LAP may not be applicable if Max (M, N)<=T, where T may be a fixed number or may be signaled from the encoder 20 to the decoder 30.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving an encoded block of luma samples for a first block of video data;
    decoding the encoded block of luma samples to create reconstructed luma samples;
    classifying reconstructed luma samples that are greater than a first threshold as being in a first sample group of a plurality of sample groups;
    classifying reconstructed luma samples that are less than the first threshold as being in a second sample group of the plurality of sample groups; and
    predicting chroma samples for the first block of video data by:
        applying a first linear prediction model of two or more linear prediction models to the reconstructed luma samples in the first sample group;
        applying a second linear prediction model of the two or more linear prediction models to the reconstructed luma samples in the second sample group, the second linear prediction model being different than the first linear prediction model; and
        determining the predicted chroma samples in the first block of video data based on the applied first linear prediction model and the applied second linear prediction model.

2. The method of claim 1, further comprising:
    determining parameters for each of the two or more linear prediction models using luma samples and chroma samples from blocks of video data that neighbor the first block of video data.

3. The method of claim 1, wherein the first threshold is dependent on neighboring coded luma and chroma samples.

4. The method of claim 1, further comprising:
    down-sampling the reconstructed luma samples.

5. The method of claim 1, further comprising:
    determining one of a plurality of down-sampling filters to use to down-sample the reconstructed luma samples;
    down-sampling the reconstructed luma samples using the determined down-sampling filter to produce down-sampled luma samples; and
    predicting chroma samples for the first block of video data using the down-sampled luma samples and the two or more linear prediction models.

6. The method of claim 1, further comprising:
    determining whether chroma samples of a second block of video data are coded using a linear prediction model of the two or more linear prediction models;
    in the case that the chroma samples of the second block of video data are not coded using the linear prediction model, the method further comprising:
        determining that a linear mode angular prediction mode is enabled;
        applying an angular mode prediction pattern to the chroma samples of the second block of video data to produce first predicted chroma values;
        applying a linear model prediction pattern to corresponding luma samples of the second block of video data to produce second predicted chroma values; and
        determining a final block of predicted chroma values for the second block of video data by determining a weighted average of the first predicted chroma values and the second predicted chroma values.

7. The method of claim 1, further comprising:
determining a number of neighboring chroma blocks, relative to the first block of video data, that are coded using a linear prediction model coding mode; and
dynamically changing a code word used to indicate a particular type of the linear prediction model coding mode based on the determined number of neighboring chroma blocks of the video data coded using the linear prediction model coding mode.

8. The method of claim 7, wherein dynamically changing the code word comprises:
using a first symbol mapping list based on the number of neighboring chroma blocks of the video data coded using the linear prediction model coding mode being zero;
using a second symbol mapping list based on the number of neighboring chroma blocks of the video data coded using the linear prediction model coding mode being less than a threshold; and
using a third symbol mapping list based on the number of neighboring chroma blocks of the video data coded using the linear prediction model coding mode being greater than the threshold.

9. A method of encoding video data, the method comprising:
encoding a block of luma samples for a first block of video data;
reconstructing the encoded block of luma samples to create reconstructed luma samples;
classifying reconstructed luma samples that are greater than a first threshold as being in a first sample group of a plurality of sample groups;
classifying reconstructed luma samples that are less than the first threshold as being in a second sample group of the plurality of sample groups; and
predicting chroma samples for the first block of video data by:
applying a first linear prediction model of the two or more linear prediction models to the reconstructed luma samples in the first sample group;
applying a second linear prediction model of the two or more linear prediction models to the reconstructed luma samples in the second sample group, the second linear prediction model being different than the first linear prediction model; and
determining the predicted chroma samples in the first block of video data based on the applied first linear prediction model and the applied second linear prediction model.

10. The method of claim 9, further comprising:
determining parameters for each of the two or more linear prediction models using luma samples and chroma samples from blocks of video data that neighbor the first block of video data.

11. The method of claim 9, wherein the first threshold is dependent on neighboring coded luma and chroma samples.

12. The method of claim 9, further comprising:
down-sampling the reconstructed luma samples.

13. The method of claim 9, further comprising:
determining one of a plurality of down-sampling filters to use to down-sample the reconstructed luma samples;
down-sampling the reconstructed luma samples using the determined down-sampling filter to produce down-sampled luma samples; and
predicting chroma samples for the first block of video data using the down-sampled luma samples and the two or more linear prediction models.

14. The method of claim 9, further comprising:
determining whether chroma samples of a second block of video data are coded using a linear prediction model of the two or more linear prediction models;
in the case that the chroma samples of the second block of video data are not coded using the linear prediction model, the method further comprising:
determining that a linear mode angular prediction mode is enabled;
applying an angular mode prediction pattern to the chroma samples of the second block of video data to produce first predicted chroma values;
applying a linear model prediction pattern to corresponding luma samples of the second block of video data to produce second predicted chroma values; and
determining a final block of predicted chroma values for the second block of video data by determining a weighted average of the first predicted chroma values and the second predicted chroma values.

15. The method of claim 9, further comprising:
determining a number of neighboring chroma blocks, relative to the first block of video data, that are coded using a linear prediction model coding mode; and
dynamically changing a code word used to indicate a particular type of the linear prediction model coding mode based on the determined number of neighboring chroma blocks of the video data coded using the linear prediction model coding mode.

16. The method of claim 15, wherein dynamically changing the code word comprises:
using a first symbol mapping list based on the number of neighboring chroma blocks of the video data coded using the linear prediction model coding mode being zero;
using a second symbol mapping list based on the number of neighboring chroma blocks of the video data coded using the linear prediction model coding mode being less than a threshold; and
using a third symbol mapping list based on the number of neighboring chroma blocks of the video data coded using the linear prediction model coding mode being greater than the threshold.

17. An apparatus configured to decode video data, the apparatus comprising:
a memory configured to receive a first block of video data; and
one or more processors configured to:
receive an encoded block of luma samples for the first block of video data;
decode the encoded block of luma samples to create reconstructed luma samples;
classify reconstructed luma samples that are greater than a first threshold as being in a first sample group of a plurality of sample groups;
classify reconstructed luma samples that are less than the first threshold as being in a second sample group of the plurality of sample groups; and
predict chroma samples for the first block of video data by:
applying a first linear prediction model of two or more linear prediction models to the reconstructed luma samples in the first sample group;
applying a second linear prediction model of the two or more linear prediction models to the reconstructed luma samples in the second sample group, the second linear prediction model being different than the first linear prediction model; and determining the predicted chroma samples in the first block of video data based on the applied first linear prediction model and the applied second linear prediction model.

18. The apparatus of claim 17, wherein the one or more processors are further configured to:

determine parameters for each of the two or more linear prediction models using luma samples and chroma samples from blocks of video data that neighbor the first block of video data.

19. The apparatus of claim 17, wherein the first threshold is dependent on neighboring coded luma and chroma samples.

20. The apparatus of claim 17, wherein the one or more processors are further configured to:

down-sample the reconstructed luma samples.

21. The apparatus of claim 17, wherein the one or more processors are further configured to:

determine one of a plurality of down-sampling filters to use to down-sample the reconstructed luma samples;

down-sample the reconstructed luma samples using the determined down-sampling filter to produce down-sampled luma samples; and predict chroma samples for the first block of video data using the down-sampled luma samples and the two or more linear prediction models.

22. The apparatus of claim 17, wherein the one or more processors are further configured to:

determine whether chroma samples of a second block of video data are coded using a linear prediction model of the two or more linear prediction models;

in the case that the chroma samples of the second block of video data are not coded using the linear prediction model, the one or more processors are further configured to:

determine that a linear mode angular prediction mode is enabled;

apply an angular mode prediction pattern to the chroma samples of the second block of video data to produce first predicted chroma values;

apply a linear model prediction pattern to corresponding luma samples of the second block of video data to produce second predicted chroma values; and determine a final block of predicted chroma values for the second block of video data by determining a weighted average of the first predicted chroma values and the second predicted chroma values.

23. The apparatus of claim 17, wherein the one or more processors are further configured to:

determine a number of neighboring chroma blocks, relative to the first block of video data, that are coded using a linear prediction model coding mode; and dynamically change a code word used to indicate a particular type of the linear model coding mode based on the determined number of neighboring chroma blocks of the video data coded using the linear prediction model coding mode.

24. The apparatus of claim 23, wherein to dynamically change the code word, the one or more processors are further configured to:

use a first symbol mapping list based on the number of neighboring chroma blocks of the video data coded using the linear prediction model coding mode being zero;

use a second symbol mapping list based on the number of neighboring chroma blocks of the video data coded using the linear prediction model coding mode being less than a threshold; and use a third symbol mapping list based on the number of neighboring chroma blocks of the video data coded using the linear prediction model coding mode being greater than the threshold.

25. An apparatus configured to encode video data, the apparatus comprising:

a memory configured to receive a first block of video data; and one or more processors configured to:

encode a block of luma samples for a first block of video data;

reconstruct the encoded block of luma samples to create reconstructed luma samples;

classify reconstructed luma samples that are greater than a first threshold as being in a first sample group of a plurality of sample groups;

classify reconstructed luma samples that are less than the first threshold as being in a second sample group of the plurality of sample groups; and predict chroma samples for the first block of video data by:

applying a first linear prediction model of the two or more linear prediction models to the reconstructed luma samples in the first sample group;

applying a second linear prediction model of the two or more linear prediction models to the reconstructed luma samples in the second sample group, the second linear prediction model being different than the first linear prediction model; and determining the predicted chroma samples in the first block of video data based on the applied first linear prediction model and the applied second linear prediction model.

26. An apparatus configured to decode video data, the apparatus comprising:

means for receiving an encoded block of luma samples for a first block of video data;

means for decoding the encoded block of luma samples to create reconstructed luma samples;

means for classifying reconstructed luma samples that are greater than a first threshold as being in a first sample group of a plurality of sample groups;

means for classifying reconstructed luma samples that are less than the first threshold as being in a second sample group of the plurality of sample groups; and means for predicting chroma samples for the first block of video data by:

applying a first linear prediction model of two or more linear prediction models to the reconstructed luma samples in the first sample group;

applying a second linear prediction model of the two or more linear prediction models to the reconstructed luma samples in the second sample group, the second linear prediction model being different than the first linear prediction model; and determining the predicted chroma samples in the first block of video data based on the applied first linear prediction model and the applied second linear prediction model.

27. A non-transitory computer-readable storage medium storing instructions that, when executed, causes one or more processors configured to decode video data to:

receive an encoded block of luma samples for the first block of video data;

decode the encoded block of luma samples to create reconstructed luma samples;

classify reconstructed luma samples that are greater than a first threshold as being in a first sample group of a plurality of sample groups;

classify reconstructed luma samples that are less than the first threshold as being in a second sample group of the plurality of sample groups; and predict chroma samples for the first block of video data by:

applying a first linear prediction model of two or more linear prediction models to the reconstructed luma samples in the first sample group;

applying a second linear prediction model of the two or more linear prediction models to the reconstructed luma samples in the second sample group, the second linear prediction model being different than the first linear prediction model; and determining the predicted chroma samples in the first block of video data based on the applied first linear prediction model and the applied second linear prediction model.

\* \* \* \* \*